United States Patent
Nie et al.

(10) Patent No.: US 11,211,052 B2
(45) Date of Patent: Dec. 28, 2021

(54) FILTERING MODEL TRAINING METHOD AND SPEECH RECOGNITION METHOD

(71) Applicant: Huawei Technologies Co., Ltd., Shenzhen (CN)

(72) Inventors: Weiran Nie, Shanghai (CN); Hai Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 16/861,856

(22) Filed: Apr. 29, 2020

(65) Prior Publication Data

US 2020/0258499 A1 Aug. 13, 2020

Related U.S. Application Data

(63) Continuation of application No. PCT/CN2018/092114, filed on Jun. 21, 2018.

(30) Foreign Application Priority Data

Nov. 2, 2017 (CN) .......................... 201711065322.4

(51) Int. Cl.
*G10L 15/02* (2006.01)
*G10L 15/04* (2013.01)
(Continued)

(52) U.S. Cl.
CPC ............ *G10L 15/063* (2013.01); *G10L 15/02* (2013.01); *G10L 15/187* (2013.01); *G10L 2015/027* (2013.01)

(58) Field of Classification Search
CPC .......... G10L 15/02; G10L 15/04; G10L 15/08
See application file for complete search history.

(56) References Cited

U.S. PATENT DOCUMENTS

| 2001/0010039 A1 | 7/2001 | Yang |
| 2002/0013707 A1* | 1/2002 | Shaw .................... G10L 15/063 704/257 |

(Continued)

FOREIGN PATENT DOCUMENTS

| CN | 1300049 A | 6/2001 |
| CN | 1588538 A | 3/2005 |

(Continued)

OTHER PUBLICATIONS

Reidhammer, K., et al., "Semi-Automatic Calibration for Dereverberation by Spectral Subtraction for Continuous Speech Recognition," ITG-Fachbericht 252: Speech Communication, Sep. 24-26, 2014, 4 pages.

(Continued)

*Primary Examiner* — Shreyans A Patel
(74) *Attorney, Agent, or Firm* — Conley Rose, P.C.

(57) ABSTRACT

A filtering model training method includes obtaining N original syllables, obtaining N recognized syllables, and obtaining N syllable distances based on the N original syllables and the N recognized syllables, where the N syllable distances are in a one-to-one correspondence with N syllable pairs, the N original syllables and the N recognized syllables form the N syllable pairs, each syllable pair includes an original syllable and a recognized syllable that correspond to each other, and each syllable distance is used to indicate a similarity between an original syllable and a recognized syllable that are included in a corresponding syllable pair.

20 Claims, 6 Drawing Sheets

(51) Int. Cl.
  *G10L 15/08* (2006.01)
  *G10L 15/06* (2013.01)
  *G10L 15/187* (2013.01)

(56) References Cited

U.S. PATENT DOCUMENTS

| | | | |
|---|---|---|---|
| 2002/0072894 A1 | 6/2002 | Kompe et al. | |
| 2003/0195743 A1* | 10/2003 | Kuo | G10L 13/07 704/207 |
| 2003/0220793 A1* | 11/2003 | Kosaka | G10L 15/22 704/270 |
| 2004/0059576 A1 | 3/2004 | Lucke | |
| 2004/0138882 A1 | 7/2004 | Miyazawa | |
| 2008/0082333 A1* | 4/2008 | Nurminen | G10L 21/00 704/250 |
| 2008/0172230 A1* | 7/2008 | Hayakawa | G10L 17/14 704/249 |
| 2009/0112594 A1 | 4/2009 | Kim et al. | |
| 2010/0228548 A1* | 9/2010 | Liu | G10L 15/065 704/251 |
| 2010/0332230 A1 | 12/2010 | Shu | |
| 2011/0224985 A1* | 9/2011 | Hanazawa | G10L 15/07 704/244 |
| 2011/0282650 A1 | 11/2011 | Jennings et al. | |
| 2012/0191456 A1 | 7/2012 | Liu et al. | |
| 2015/0120301 A1* | 4/2015 | Jiang | G10L 15/19 704/251 |
| 2016/0322055 A1 | 11/2016 | Sainath et al. | |
| 2017/0263241 A1 | 9/2017 | Zhu et al. | |
| 2018/0322865 A1 | 11/2018 | Huang et al. | |
| 2020/0258499 A1* | 8/2020 | Nie | G10L 15/187 |

FOREIGN PATENT DOCUMENTS

| | | |
|---|---|---|
| CN | 1741131 A | 3/2006 |
| CN | 103680495 A | 3/2014 |
| CN | 107016994 A | 8/2017 |
| CN | 107103903 A | 8/2017 |
| CN | 107195296 A | 9/2017 |
| CN | 107195299 A | 9/2017 |
| JP | S6126096 A | 2/1986 |
| JP | H02181798 A | 7/1990 |
| JP | 2002040926 A | 2/2002 |
| JP | 2002156994 A | 5/2002 |
| JP | 2002366187 A | 12/2002 |
| JP | 2004206063 A | 7/2004 |
| JP | 2005242181 A | 9/2005 |
| JP | 2008129028 A | 6/2008 |
| JP | 2015055653 A | 3/2015 |
| JP | 2017049537 A | 3/2017 |

OTHER PUBLICATIONS

Yu, D., et al., "Calibration of Confidence Measures in Speech Recognition," in IEEE Transactions on Audio, Speech, and Language Processing, vol. 19, No. 8, Jul. 2010, 13 pages.

Feng, X., "On Using Heterogeneous Data for Vehicle-based Speech Recognition: A DNN-Based Approach," 2015 IEEE International Conference on Acoustics, Speech and Signal Processing (ICASSP), 2015, pp. 4385-4389.

* cited by examiner

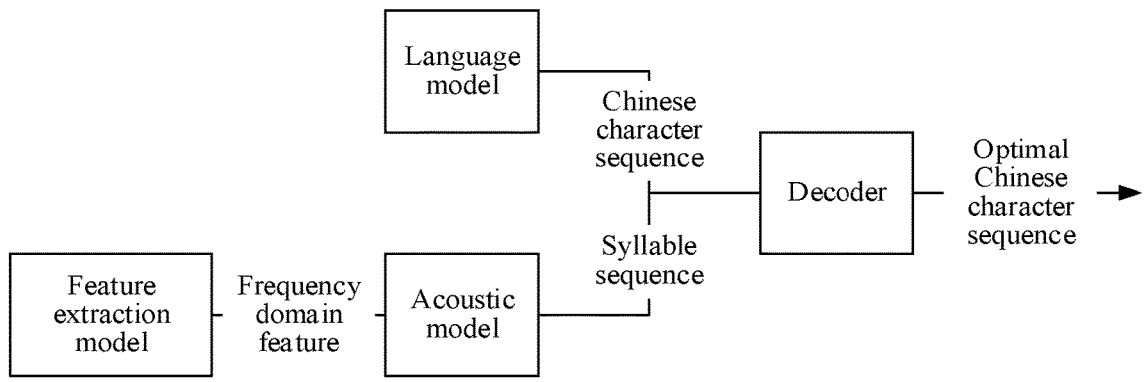
FIG. 1
100
110. Obtain N syllable distances that are in a one-to-one correspondence with N syllable pairs
120. Train a filtering model based on the N syllable distances
FIG. 2
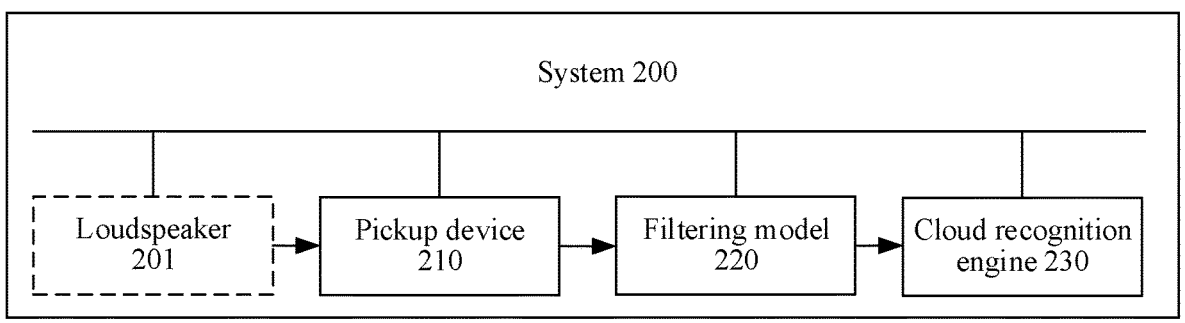
FIG. 3

FILTERING MODEL TRAINING METHOD AND SPEECH RECOGNITION METHOD

CROSS-REFERENCE TO RELATED APPLICATIONS

This application is a continuation of International Patent Application No. PCT/CN2018/092114, filed on Jun. 21, 2018, which claims priority to Chinese Patent Application No. 201711065322.4, filed on Nov. 2, 2017, both of which are hereby incorporated by reference in their entireties.

TECHNICAL FIELD

This application relates to the field of speech recognition technologies, and more specifically, to a filtering model training method, a speech recognition method, a training device, a speech recognition device, and a speech recognition system.

BACKGROUND

Automatic speech recognition (ASR) is a key technology of a speech interaction system, and an ASR engine (also referred to as a speech recognition engine) is responsible for converting a speech signal into a text. FIG. 1 is a schematic diagram of an example in which the ASR engine performs speech recognition. As shown in FIG. 1, after a pickup device collects a sound, and obtains a (frequency domain) feature, of a speech signal, extracted by a feature module, an acoustic model converts the sound into a syllable sequence (for example, a consonant sequence and a vowel sequence in Chinese pinyin). Then, a decoder searches a language model for a character sequence (for example, a Chinese character sequence) corresponding to the syllable sequence.

However, in other approaches, a correspondence between a syllable sequence and a character sequence in the language model is obtained by training based on a preset database. In actual use, the correspondence is affected by an environment, a user articulation habit, and the like. As a result, a sound signal for a speech in the database may be inconsistent with an actually collected sound signal for the same speech, and finally, the speech cannot be recognized.

SUMMARY

This application provides a filtering model training method and device, to help improve accuracy of speech recognition performed by a speech recognition engine.

According to a first aspect, a filtering model training method is provided, and the method includes determining N original syllables, where the N original syllables are syllables included in an actual pronunciation of a first corpus, and N is an integer greater than or equal to 1, determining N recognized syllables, where the N recognized syllables are syllables of a recognition result obtained after first speech recognition processing is performed on sound signals of the first corpus, the first speech recognition processing includes filtering processing based on the filtering model and recognition processing based on a speech recognition engine, and the N recognized syllables are in a one-to-one correspondence with the N original syllables, determining N syllable distances based on the N original syllables and the N recognized syllables, where the N syllable distances are in a one-to-one correspondence with N syllable pairs, the N original syllables and the N recognized syllables form the N syllable pairs, each syllable pair includes an original syllable and a recognized syllable that correspond to each other, and each syllable distance is used to indicate a similarity between an original syllable and a recognized syllable that are included in a corresponding syllable pair, and training the filtering model based on the N syllable distances.

Optionally, the "similarity" between the original syllable and the recognized syllable may be determined based on a character error rate or a syllable error rate between the original syllable and the recognized syllable.

For example, a higher character error rate or syllable error rate between the original syllable and the recognized syllable indicates a lower similarity between the original syllable and the recognized syllable.

The character error rate between the original syllable and the recognized syllable may be a ratio of a quantity of incorrectly recognized characters (or letters) to a quantity of a plurality of characters in the plurality of characters (or letters) corresponding to the original syllable and a plurality of characters (or letters) corresponding to the recognized syllable. That is, a value of the character error rate is a ratio of a quantity of incorrectly recognized characters to a total quantity of characters.

The character error rate between the original syllable and the recognized syllable may be a ratio of a quantity of incorrectly recognized syllables to a quantity of a plurality of syllables in the plurality of syllables corresponding to the original syllable and a plurality of syllable corresponding to the recognized syllable. That is, a value of the syllable error rate is a ratio of a quantity of incorrectly recognized syllables to a total quantity of syllables.

Optionally, the training the filtering model based on the N syllable distances includes training the filtering model based on the N syllable distances such that a value of each of M syllable distances corresponding to a second corpus falls within a first preset range, where the M syllable distances are in a one-to-one correspondence with M syllable pairs, M original syllables included in the M syllable pairs are syllables included in an actual pronunciation of the second corpus, the M recognized syllables included in the M syllable pairs are syllables of a recognition result obtained after second speech recognition processing is performed on sound signals of the second corpus, M is an integer greater than or equal to 1, and the second speech recognition processing includes filtering processing based on a filtering model obtained by training and the recognition processing based on the speech recognition engine.

In this embodiment of this application, according to the filtering model training method in this application, a real original syllable of a training corpus is obtained in advance, a recognized syllable is obtained after a speech recognition engine performs recognition processing on the training corpus, and a syllable distance between the original syllable and the recognized syllable is further determined. Therefore, a filter cooperated with the speech recognition engine can be trained based on the syllable distance such that a sound signal (or a sound signal processed by a filtering model) input into the speech recognition engine can match a speech signal that can be accurately recognized by the speech recognition engine, thereby improving recognition accuracy.

Optionally, the training the filtering model based on the N syllable distances includes determining a scoring model based on the sound signals of the first corpus and the N syllable distances, determining K syllable distances based on the scoring model and sound signals of a third corpus, where an actual pronunciation of the third corpus includes K original syllables, a recognition result obtained after the first speech recognition processing is performed on the sound signals of the third corpus includes K recognized syllables, the K recognized syllables are in a one-to-one correspondence with the K original syllables, the K syllable distances are in a one-to-one correspondence with K syllable pairs, the K original syllables and the K recognized syllables form the K syllable pairs, each syllable pair includes an original syllable and a recognized syllable that correspond to each other, each syllable distance is used to indicate a similarity between an original syllable and a recognized syllable included in a corresponding syllable pair, and K is an integer greater than or equal to 1, and training the filtering model based on the N syllable distances and the K syllable distances.

Therefore, an amount of data used to train the filtering model can be increased, and recognition accuracy can be further improved.

Optionally, the sound signals of the first corpus are obtained based on a first pickup device, and the first pickup device is a pickup device configured to obtain the sound signals of the second corpus.

Optionally, the sound signals of the third corpus are obtained based on the first pickup device, and the first pickup device is a pickup device configured to obtain the sound signals of the first corpus.

The foregoing training process and speech recognition process are performed based on same sound signals, and this can further improve a matching degree between the filtering model and the speech recognition engine, and further improve accuracy of speech recognition.

In this embodiment of this application, the pickup device for collecting speech data for training the filtering model is enabled to be consistent with a pickup device for collecting a filtering object of the filtering model in actual use such that an application condition of the filtering model can match the pickup device. In other words, according to the method, the filtering model, the speech recognition engine, and the pickup device may match each other, and this helps improve recognition accuracy.

Optionally, each syllable includes at least one phoneme, and the determining N syllable distances based on the N original syllables and the N recognized syllables includes obtaining first mapping relationship information, where the first mapping relationship information is used to indicate a phoneme distance between a plurality of phonemes, and a phoneme distance between any two phonemes is used to indicate a similarity between any two phonemes, and determining the N syllable distances based on the first mapping relationship information.

Optionally, the determining the N syllable distances based on the first mapping relationship information includes determining W original phonemes included in the N original syllables, and determining W recognized phonemes included in the N recognized syllables, where the W original phonemes are in a one-to-one correspondence with the W recognized phonemes, and W is an integer greater than or equal to 1, determining W phoneme distances based on the first mapping relationship, where the W phoneme distances are in a one-to-one correspondence with the W phoneme pairs, each phoneme distance is a phoneme distance between phonemes included in a corresponding phoneme pair, and a phoneme pair includes an original phoneme and a recognition phoneme that correspond to each other, and determining the N syllable distances based on the W phoneme distances.

Optionally, the determining the N syllable distances based on the W phoneme distances includes determining the N syllable distances based on an average value of the W phoneme distances.

In this way, a syllable distance can be easily determined.

Optionally, when N is greater than or equal to 2, the method further includes determining an arrangement sequence and articulation duration of the N original syllables, determining obtaining moments of the N recognized syllables, and determining the N syllable pairs based on the arrangement sequence and the articulation duration of the N original syllables and the obtaining moments of the N recognized syllables.

Therefore, when N≥2, a syllable pair can be easily determined, and practicability of this application can be improved.

Optionally, the training the filtering model based on the N syllable distances includes determining environment information of an environment in which the filtering model is used, and training the filtering model based on the N syllable distances and the environment information.

Optionally, when the filtering model is configured in a vehicle, the environment information includes at least one of the following information vehicle speed information, information about whether a vehicle window is open or closed, or air volume information of an air conditioner.

Optionally, the environment information includes device information of the pickup device, for example, a model or a manufacturer of the pickup device.

In this embodiment of this application, an embodiment in which the speech data for training the filtering model is collected is consistent with the filtering model for training the speech data. In actual use, the filtering model performs filtering on the speech data collected in the device environment. That is, an application condition of the filtering model matches the device environment. In other words, according to the method, the filtering model, the speech recognition engine, and the device environment may match each other, and this helps improve recognition accuracy.

Optionally, the method further includes obtaining user information of a user that obtains a filtering model, where the user information includes a frequency at which the user uses each of a plurality of corpora, and determining the first corpus from the plurality of corpora based on the user information.

Optionally, the method further includes obtaining user information of a user that obtains a filtering model, where the user information includes a frequency at which the user uses each of the plurality of corpora, and determining the third corpus from the plurality of corpora based on the user information.

The corpus used to train the filtering model is determined based on the user information such that the determined filtering model can match a user use habit, thereby helping improve recognition accuracy.

Optionally, the determining the N original sound nodes includes determining a first event that occurs in a first time range, where the first time range is determined based on the obtaining moments of the N recognized syllables, and determining, based on second mapping relationship information, syllables corresponding to the first event as the N original syllables, where the second mapping relationship information is used to indicate syllables corresponding to a plurality of events including the first event.

Therefore, online training can be performed on a filtering model based on speech sent by a user. The online training may be training on the filtering model when the user uses the speech recognition engine.

Optionally, the first time range is a time range with first preset duration that starts from the obtaining moment, and at least one candidate event occurs in the first time range, or the first time range is determined based on occurrence time of a plurality of candidate events, and an occurrence time interval between any two of the plurality of candidate events is less than or equal to second preset duration, and the first event is any one of the plurality of candidate events.

In this way, excessively long time for determining an original syllable can be avoided, user experience can be improved, and practicability of this application can be improved.

The determining the N original syllables includes determining, based on third mapping relationship information, syllables corresponding to the first corpus as the N original syllables, where the third mapping relationship information is used to indicate syllables corresponding to the plurality of corpora including the first corpus.

According to a second aspect, a speech recognition method is provided, where the method includes obtaining a first sound signal, performing filtering processing on the first sound signal based on a filtering model, where the filtering model is obtained according to the method according to any one of the first aspect and the possible implementations of the first aspect, and performing, based on the speech recognition engine, recognition processing on the first sound signal obtained after the filtering processing.

Optionally, the obtaining a first sound signal includes obtaining, by a first pickup device, the first sound signal, where the first pickup device is a pickup device configured to obtain sound signals of the first corpus.

Optionally, the obtaining a first sound signal includes obtaining the first sound signal based on environment information used when the filtering model is trained.

According to a third aspect, a training device is provided, and includes a memory and a processor. The memory is configured to store a computer program, and the processor is configured to invoke the computer program from the memory and run the computer program such that the system performs the method according to any one of the first aspect or the possible implementations of the first aspect.

According to a third aspect, a training device is provided, and includes a memory and a processor. The memory is configured to store a computer program, and the processor is configured to invoke the computer program from the memory and run the computer program such that the system performs the method according to any one of the second aspect or the possible implementations of the second aspect.

According to a fifth aspect, a computer readable storage medium is provided, and the computer readable storage medium stores an instruction. When the instruction is run on a computer, the computer is enabled to perform the method according to any one of the first aspect or the possible implementations of the first aspect.

According to a sixth aspect, a computer readable storage medium is provided, and the computer readable storage medium stores an instruction. When the instruction is run on a computer, the computer is enabled to perform the method according to any one of the second aspect or the possible implementations of the second aspect.

According to a seventh aspect, a computer program product including an instruction is provided, and when the computer program product is run on a computer, the computer is enabled to perform the method according to any one of the first aspect or the possible implementations of the first aspect.

According to an eighth aspect, a computer program product including an instruction is provided, and when the computer program product is run on a computer, the computer is enabled to perform the method according to any one of the second aspect or the possible implementations of the second aspect.

According to a ninth aspect, a speech recognition system is provided, including the training device provided in the third aspect and the speech recognition device provided in the fourth aspect.

In this embodiment of this application, according to the filtering model training method in this application, a real original syllable of a training corpus is obtained in advance, a recognized syllable is obtained after a speech recognition engine performs recognition processing on the training corpus, and a syllable distance between the original syllable and the recognized syllable is further determined. Therefore, a filter cooperated with the speech recognition engine can be trained based on the syllable distance such that a sound signal (or a sound signal processed by a filtering model) input into the speech recognition engine can match a speech signal that can be accurately recognized by the speech recognition engine, thereby improving recognition accuracy.

BRIEF DESCRIPTION OF DRAWINGS

FIG. 1 is a schematic diagram of an example of speech recognition performed by an ASR system.

FIG. 2 is a schematic flowchart of an example of a filtering model training method according to an embodiment of this application.

FIG. 3 is a schematic diagram of an example of a filtering model training system according to an embodiment of this application.

DESCRIPTION OF EMBODIMENTS

Figure 4:
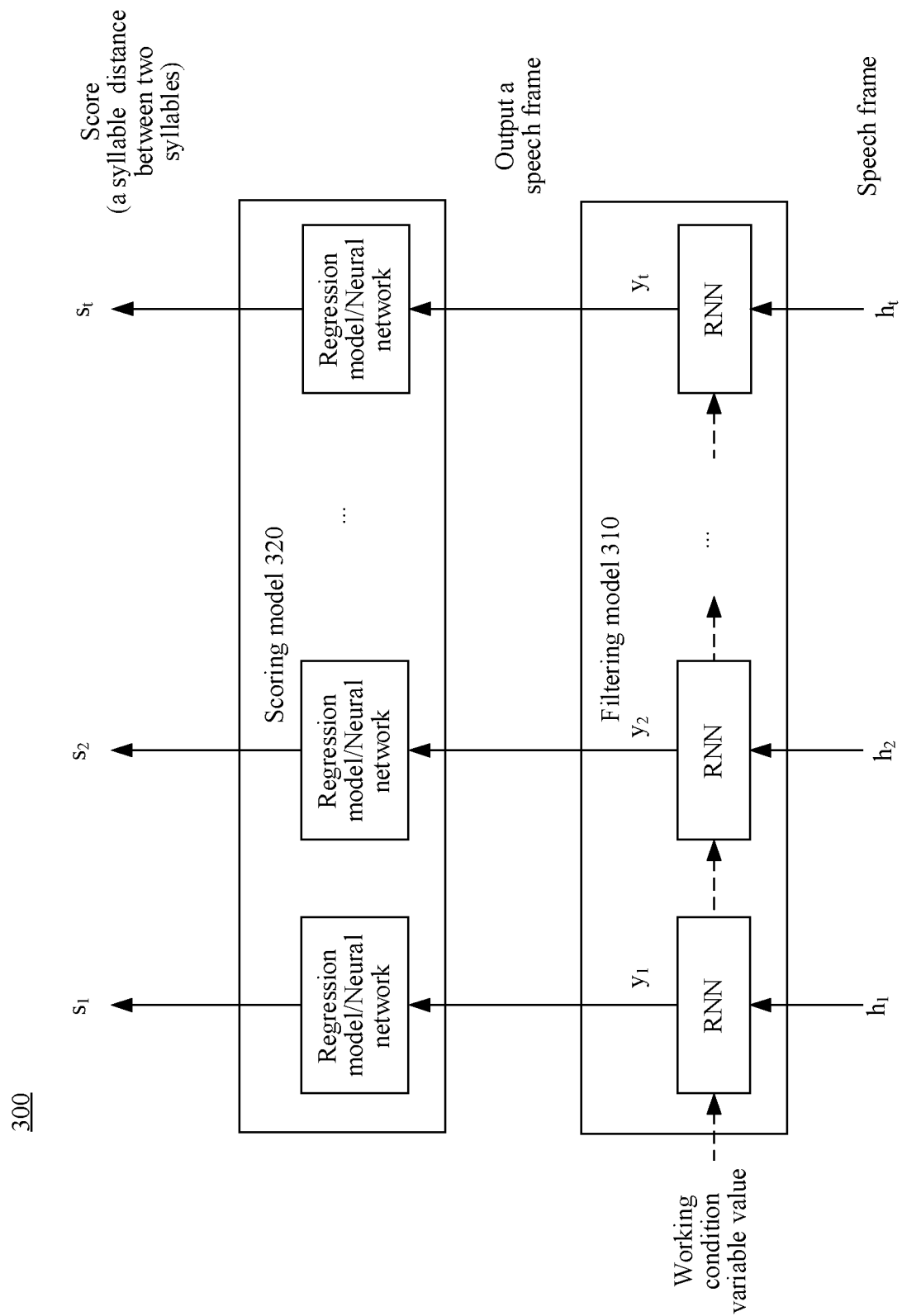
FIG. 4 is a schematic diagram of another example of a filtering model training system according to an embodiment of this application.

The following describes technical solutions in this application with reference to the accompanying drawings.

It should be understood that division of manners, cases, types, and embodiments in the embodiments of this application are only for ease of description, but should not constitute any special limitation, and features in various manners, types, cases, and embodiments may be combined when there is no contradiction.

It should also be understood that "first", "second", and "third" in the embodiments of this application are merely intended to distinguish, and should not be construed as any limitation on this application.

It should be further understood that sequence numbers of the processes do not mean execution sequences in various embodiments of this application. The execution sequences of the processes should be determined according to functions and internal logic of the processes, and should not be construed as any limitation on the implementation processes of the embodiments of this application.

It should be further understood that, at least one may include one or more in the embodiments of this application.

To facilitate understanding of this application, some concepts in this application are first briefly described.

1. Corpus

The corpus may be a character, a word, a sentence, a paragraph, an article, or any combination thereof 2. Original Corpus In the embodiments of this application, the original corpus may be understood as a real expression. For example, the original corpus may be a corpus played by a loudspeaker, a corpus spoken by an operator, or a corpus spoken by a user. For example, the loudspeaker plays "da kai kong tiao" (which means "turn on the air conditioner" in English), and "da kai kong tiao" is an original corpus. For another example, the user speaks "da kai che chuang" (which means "open the vehicle window" in English), and "da kai che chuang" is an original corpus.

3. Syllable

The syllable is a most natural structure unit in speech. Specifically, the syllable is a smallest speech structure unit combined by phonemes. The syllable includes three parts a head, a venter, and a tail, and there is an obvious perceptible boundary in the syllable. One or several phonemes are combined according to a specific rule, to form one syllable.

For example, in Chinese, a syllable may include an initial consonant syllable and a vowel (it should be understood that vowels include a simple vowel and a compound vowel) syllable. For example, the Chinese character "da" includes two syllables "d" and "a". In Chinese, a pronunciation of one Chinese character is usually one syllable. Generally, there are 400 toneless syllables, and there are 1300 tone syllables (excluding neutral syllables) in mandarin.

For another example, in English, a syllable is a basic unit of pronunciation. For any word syllable, a pronunciation of a monosyllabic pictograph is decomposed into syllables one by one for reading. In English, vowels (a total of five vowels a, e, i, o, and u) are extremely strong, a vowel phoneme (a phoneme is not a letter) may form one syllable, and one vowel phoneme and one or more consonant phonemes may be combined to form one syllable. Generally, a vowel phoneme may form a syllable, and a consonant phoneme is not strong and cannot form a syllable. For example, an English word "up" includes two syllables "u" and "p".

It should be understood that the syllables in the embodiments of this application may include a corresponding syllable in Chinese, or may include a corresponding syllable in another language (for example, English, French, or Russian).

4. Syllable Distance

The syllable distance is a distance between syllables (specifically, phonemes included in two syllables). In the embodiments of this application, the syllable distance may be a distance between a plurality of phonemes in two syllables, or may be a distance between two syllable sequences (or referred to as phoneme sequences). A phoneme distance may be determined according to a predefined phoneme distance rule, to further determine the syllable distance. The predefined phoneme distance rule may be predefined by a linguist according to a linguistic feature, for example, an international phonetic alphabet (IPA) table, or may be predefined by an engineer based on an engineering practice and intuitive feeling.

There is a one-to-one or one-to-many (for example, one compound vowel corresponds to a plurality of IPAs) relationship between Chinese pinyin and IPAs. Therefore, an articulation distance table may be defined for vowels and initial consonants of Chinese pinyin according to a same principle (that is, a place of articulation and a manner of articulation). For a sample articulation distance table, refer to Table 1 in the disclosure.

Optionally, the predefined phoneme distance rule may be embodied using a phoneme distance matrix (or referred to as a phoneme distance table). Table 1 shows an example of a phoneme distance matrix in Chinese.

TABLE 1

Phoneme distance matrix

| | Vowel syllables | | | | | | | ... | Initial consonant syllable | | | | ... |
|---|---|---|---|---|---|---|---|---|---|---|---|---|---|
| | a | o | e | i | u | ü | ai | | b | P | m | f | |
| a | 0 | 0.2 | 0.3 | 0.4 | 0.4 | 0.5 | 0.1 | | 0.8 | 0.9 | 0.7 | 0.9 | |
| o | | 0 | 0.2 | 0.4 | 0.3 | 0.5 | 0.3 | | 0.7 | 0.8 | 0.7 | 0.9 | |
| e | | | 0 | 0.2 | 0.5 | 0.3 | 0.2 | | 0.6 | 0.8 | 0.9 | 0.9 | |
| i | | | | 0 | 0.3 | 0.2 | 0.5 | | 0.6 | 0.8 | 0.9 | 0.9 | |
| u | | | | | 0 | 0.1 | 0.3 | | 0.5 | 0.5 | 0.4 | 0.7 | |
| ü | | | | | | 0 | 0.3 | | 0.5 | 0.6 | 0.7 | 0.8 | |
| ai | | | | | | | 0 | | 0.8 | 0.9 | 0.6 | 0.9 | |

The first row and the first column of the syllable distance matrix may be sets of all Chinese pinyin syllables (including the initial consonants and the vowels). Each cell in the table represents a syllable distance between corresponding syllables in a row and a column, and a syllable distance is a normalized (from 0 to 1) non-negative value. A cell on a diagonal indicates a distance between same syllables, and a value of the distance is zero. A smaller syllable distance indicates more similar articulations of two syllables. For example, a syllable distance between "a" and "ai" is 0.1. A greater syllable distance indicates a greater difference between articulations of two syllables. For example, a syllable distance between "a" and "f" is 0.8.

For two syllables, a syllable distance between the two syllables may be determined according to the predefined syllable distance rule. For example, assuming that two syllables are syllables "a" and "ai", it may be determined, according to Table 1, that a syllable distance between the two syllables is 0.1.

For two syllable sequences, a syllable distance between the two syllable sequences may be an average value (for example, an arithmetic average value) of phoneme distances included in the two syllable sequences. For example, it is assumed that two syllable sequences are respectively "da kai che chuang" (syllables corresponding to "da kai che chuang") and "da ke cha chuang" (syllables corresponding to "da ke cha chuang"). It is determined from Table 1 that a syllable distance between "ai" and "e" is 0.2, and a syllable distance between "e" and "a" is 0.3, and it may be determined that a syllable distance between "da kai che chuang" and "da ke cha chuang" is (0.2+0.3)/2=0.25.

It should be understood that the foregoing listed method for determining the syllable distance based on the phoneme distances is merely an example for description, and this is not limited in this application. For example, weights may be allocated to phoneme distances, and a weighted average value of the phoneme distances is determined as the syllable distance.

It should be understood that the foregoing listed specific values of the syllable distances between the phonemes in Table 1 are merely examples for description, and are not specifically limited in this application. A user may properly adjust the distances between the phonemes as required.

In addition, the IPA describes articulation features of consonant and vowel phonemes in a language such as English from two dimensions a place of an organ of articulation and a manner of articulation. The places of articulation include lips, teeth, lips and teeth, a lung, a rolled tongue, a palate, a pharynx, and the like. The manner of articulation includes a plosive, a nasal, a trill, and a fricative. For example, assuming that a phoneme distance (or an articulation distance) between a phoneme s and a phoneme t is L, if places of articulation of s and t are the same, and manners of articulation are the same, L=0 may be determined, if places of articulation of s and t are the same, but manners of articulation are different, L=0.2 may be determined, if places of articulation of s and t are different, but manners of articulation are the same, L=0.4 may be determined, or if places of articulation of s and t are different, and manners of articulation are different, L=0.8 may be determined.

There is a one-to-one or one-to-many (for example, one compound vowel corresponds to a plurality of IPAs) relationship between Chinese pinyin and IPAs. Therefore, an articulation distance table may be defined for vowels and initial consonants of Chinese pinyin according to a same principle (that is, a place of articulation and a manner of articulation), for example, Table 1.

It should be understood that the methods for determining the syllable distance described above are merely examples for description, and this is not limited in this application. Alternatively, the syllable distance may be determined based on a character error rate or a syllable error rate.

The character error rate is a ratio of a quantity of characters (or letters) that are incorrectly recognized (in an embodiment, a recognition result is inconsistent with an actual character (or letter)) and that are in characters (or letters) obtained through speech recognition, to a total quantity of characters (or letters) corresponding to speech signals of characters (or letters).

For example, if speech signals corresponding to "da kai kong tiao" are recognized as "da ke kong tiao", a total quantity of characters corresponding to the speech signals is 4, and a quantity of characters that are incorrectly recognized is 1. Therefore, a syllable distance corresponding to the speech signals may be ¼.

In addition, the syllable error rate is a ratio of a quantity of syllables that are incorrectly recognized (in an embodiment, a recognition result is inconsistent with an actual syllable) and that are in syllables obtained through speech recognition, to a total quantity of syllables corresponding to speech signals.

For example, if the speech signals corresponding to "da kai kong tiao" are recognized as "da ke kong tiao", a total quantity of syllables corresponding to the speech signals is 4, and a quantity of syllables that are incorrectly recognized is 1. Therefore, a syllable distance corresponding to the speech signals may be ¼.

5. Working Condition

The working condition is related to a device, and may be understood as a working state of the device. For example, a working condition of a vehicle may be understood as a working state of the vehicle.

6. Working Condition Variable

The working condition variable may be a variable that describes a working condition of a device. For example, the device is a vehicle. A working condition variable of the vehicle may include at least one of variables such as a vehicle speed, a vehicle window status, a road type, an air conditioner status, and a rain wiper status.

For example, the working condition variable of the vehicle may include the vehicle speed, and a speed value of the vehicle speed includes 40 kilometers/hour (urban area) and 90 kilometers/hour (expressway). The working condition variable of the vehicle may further include the vehicle window status, and the vehicle window status includes an opened state and a closed state. The working condition variable of the vehicle may further include air conditioner volume ranks. The air conditioner volume ranks include 0 (off), 1 (cold air), and 2 (hot air). Based on the three working condition variables, 12 working conditions can be formed by permutation and combination.

Optionally, in the embodiments of this application, inputs to a filtering model may include a working condition variable value, to implement conditioning of the filtering model. It should be understood that, although discrete working condition variables are used in a training phase, interpolation fitting is automatically performed on a continuous actual working condition due to learning and flooding capabilities of a neural network.

7. Calibration Script

The calibration script is a computer-readable file stored in a memory, and the calibration script may record a corpus sample. Optionally, the calibration script may record a combination of a working condition variable value and a key-value pair of a corpus sample. Each row of content in the calibration script can be read sequentially and a working condition variable value and a corresponding corpus sample can be parsed out (by a filtering model training device), to train the model. The calibration script may be a static file prestored in a hard disk, or may dynamically change.

8. Filtering Model

The filtering model is used to perform filtering processing on a received speech signal. An input into the filtering model may include speech data output by a pickup device (for example, a microphone or a microphone array). For example, the input into the filtering model may further include feature data (for example, a Mel-cepstrum coefficient) of a speech frame (for example, a speech signal of 50 milliseconds) output by the pickup device, and an output of the filtering model may be feature data of a speech frame on which filtering processing is performed. Optionally, the feature data may include a frequency domain feature or a time domain feature. Optionally, the input into the filtering model may further include a working condition variable value.

8. Scoring Model

The scoring model is used to train a filtering model. An input into the scoring model may be an output of the filtering model, and an output of the scoring model is a scalar value.

It should be understood that the method in the embodiments of this application may be applied to various languages such as Chinese, English, Russian, and French. For ease of description, the following uses Chinese as an example. For detailed descriptions of applying the method in the embodiments of this application to another language, refer to related descriptions of the example of Chinese.

The following describes in detail a filtering model training method in the embodiments of this application with reference to FIG. 2.

FIG. 2 is a schematic flowchart of an example of a filtering model training method according to an embodiment of this application. It should be understood that FIG. 2 shows detailed steps or operations of a method 100. However, these steps or operations are merely an example. In this embodiment of this application, another operation may be further performed or only some of the operations in FIG. 2 may be performed.

As shown in FIG. 2, the method 100 may include 110 and 120. Optionally, the method 100 may be performed by a processor, a server, a controller, a filtering model training device, another device, or another system. For ease of description, an example in which the filtering model training device performs the method 100 is described below. It should be understood that for descriptions of performing the method 100 by the other device, refer to related descriptions of performing the method 100 by the device.

110. Obtain N syllable distances that are in a one-to-one correspondence with N syllable pairs.

Each syllable pair includes a first syllable and a second syllable, and each syllable distance is a syllable distance between a first syllable and a second syllable in a corresponding syllable pair. A first syllable in an $i^{th}$ syllable pair is a syllable of an actual pronunciation of an original corpus (an example of a first corpus) corresponding to the $i^{th}$ syllable pair, and a second syllable in the $i^{th}$ syllable pair is a syllable of a recognition result obtained after recognition processing is performed on speech data of the corpus corresponding to the $i^{th}$ syllable pair. The $i^{th}$ syllable pair is any one of the N syllable pairs, where N≥1.

It should be understood that the recognition processing includes processing based on a first filtering model (an example of a filtering model) and processing based on a speech recognition engine. Further, it is well known that speech data processed using the filtering model, and then processed by the speech recognition engine may be marked as "speech data obtained after the recognition processing". For ease of understanding, the speech data processed using the first filtering model, and then processed by the speech recognition engine may alternatively be understood as "speech data obtained after the first recognition processing".

It should be further understood that, the speech data of the original corpus may be collected by a pickup device. In an embodiment, the speech data collected by the pickup device may be input into the first filtering model for processing, and the speech data processed using the first filtering model is input into the speech recognition engine, to obtain the recognition result.

For ease of description, the recognition result obtained after the recognition processing is performed on the speech data of the original corpus may be denoted as "the recognition result corresponding to the original corpus". For example, a loudspeaker plays "da kai kong tiao", and "da ke kong tiao" is obtained after the recognition processing is performed on the speech data corresponding to "da kai kong tiao". In this case, "da ke kong tiao" is a recognition result corresponding to "da kai kong tiao".

In an optional example, the first syllable may be a syllable, and the second syllable may be a syllable. For example, it is assumed that the original corpus is "da kai kong tiao", and a recognition result corresponding to "da kai kong tiao" is "da ke kong tiao". The N syllable pairs may include a syllable pair #α, a first syllable in the syllable pair #α is "ai" in "kai", and a second syllable is "e" in "ke". A syllable distance corresponding to the syllable pair #a is a syllable distance between "ai" and "e".

In another optional example, the first syllable may be a syllable sequence, and the second syllable may be a syllable sequence. For example, it is assumed that the original corpus is "da kai kong tiao", and the recognition result corresponding to "da kai kong tiao" is "da ke kong tiao". The N syllable pairs may include a syllable pair #β, a first syllable of the syllable pair #β is "da kai kong tiao", and a second syllable is "da ke kong tiao". A syllable distance corresponding to the syllable pair #β is a syllable distance between "da kai kong tiao" and "da ke kong tiao".

In another optional example, one of the first syllable and the second syllable may be a syllable, and the other may be a syllable sequence. For example, the first syllable is "kai", and the second syllable is "a", and in this case, the first syllable and the second syllable have different lengths. The first syllable and the second syllable can have a same length by filling a mute syllable ε. Optionally, the first syllable and the second syllable may be aligned using a dynamic time warping (DTW) open-source algorithm.

The following describes this embodiment of this application using an example in which the first syllable and the second syllable each are a syllable sequence. It should be understood that for related descriptions about an example in which the first syllable and the second syllable each are a syllable, refer to descriptions about the example in which the first syllable and the second syllable each are a syllable sequence.

In this embodiment of this application, a syllable pair corresponds to a syllable distance, and a syllable pair includes a syllable of an original corpus and a syllable of a recognition result corresponding to the original corpus. For example, the loudspeaker plays "da kai kong tiao", and a recognition result corresponding to "da kai kong tiao" is "da ke kong tiao". Syllables "da kai kong tiao" of the original corpus and syllables "da ke kong tiao" of the recognition result corresponding to the original corpus may form a syllable pair, and correspond to a syllable distance. Similarly, the loudspeaker plays "da kai che chuang", and a recognition result corresponding to "da kai che chuang" is "da kai cha chuang". "Da kai che chuang" and "da kai cha chuang" may form a syllable pair, and correspond to a syllable distance. The filtering model training device may obtain the syllable distance between "da kai kong tiao" and "da ke kong tiao" and the syllable distance between "da kai che chuang" and "da kai cha chuang".

It should be understood that the filtering model training device may obtain the N syllable distances in one of a plurality of manners. For example, the N syllable distances transmitted by another device may be received. For another example, the N syllable distances that are in a one-to-one correspondence with the N syllable pairs may be determined according to a predefined syllable distance rule.

For example, in this embodiment of this application, N original syllables of the first corpus may be determined, and the N original syllables may be preconfigured in the training device by a user, an operator, or a manufacturer, for example, syllables "da kai kong tiao" corresponding to "da kai kong tiao".

In addition, in this embodiment of this application, N recognized syllables of the first corpus may be determined, and the N recognized syllables may be syllables recognized by an untrained speech recognition engine, for example, syllables "da ke kong tiao" corresponding to "da ke kong tiao".

Then, for example, a syllable distance between an original syllable and a recognized syllable in each syllable pair may be determined according to Table 1, to determine the N syllable distances.

220. Train the first filtering model based on the N syllable distances to obtain a target filtering model (a filtering model obtained by training) corresponding to the speech recognition engine, where the speech recognition engine and the target filtering model are used for speech recognition.

In this embodiment of this application, the target filtering model is obtained based on the N syllable distances, and the N syllable distances are obtained based on the recognition result of the speech recognition engine. This is equivalent to that the target filtering model is obtained based on the recognition result of the speech recognition engine. Based on this, the target filtering model obtained using the method in this embodiment of this application adapts to the speech recognition engine, in other words, the target filtering model corresponds to the speech recognition engine.

For example, a target filtering model #a is obtained based on a speech recognition engine #A, the target filtering model #a adapts to the speech recognition engine #A, and the target filtering model #a cooperates with the speech recognition engine #A to perform speech recognition. If the speech recognition engine #A is replaced with a speech recognition engine #B, filtering model training needs to be performed again based on the speech recognition engine #B, to obtain a target filtering model adapted to the speech recognition engine #B. That "the target filtering model #a is obtained based on the speech recognition engine #A" may be understood as "obtaining a plurality of syllable distances based on a recognition result of the speech recognition engine #A, and obtaining the target filtering model #a by training based on the plurality of syllable distances".

In other words, target filtering models in this embodiment of this application are dedicated. A target filtering model is obtained based on a recognition result of a type of (a class of or a specific) speech recognition engine, and the target filtering model is a filtering model dedicated to the type of (the class of or the specific) speech recognition engine.

In an optional example, filtering model training needs to be performed on any speech recognition engine, to obtain a target filtering model adapted to the speech recognition engine.

In another optional example, filtering model training needs to be performed on a speech recognition engine of any model, to obtain a target filtering model adapted to the speech recognition engine of the model.

In still another optional example, filtering model training needs to be performed on a speech recognition engine of any manufacturer, to obtain a target filtering model adapted to the speech recognition engine of the manufacturer.

According to the method in this embodiment of this application, the target filtering model adapted to the speech recognition engine is obtained by training, and the target filtering model cooperates with the speech recognition engine. This helps improve accuracy of speech recognition performed by the speech recognition engine.

Further, optionally, in this embodiment of this application, the speech recognition engine and the target filtering model may process speech data obtained in a specific condition.

1. The target filtering model and the speech recognition engine are used to perform recognition processing on speech data collected by a "specific pickup device".

The "specific pickup device" is specifically a pickup device that collects the speech data of the original corpus corresponding to the $i^{th}$ syllable pair. In other words, the "specific pickup device" may also be understood as a pickup device configured to collect speech data of an original corpus in a filtering model training process.

For example, the target filtering model #a is obtained based on the speech recognition engine #A and a pickup device #1. The speech recognition engine #A, the pickup device #1, and the target filtering model #a adapt to each other. The speech recognition engine #A may cooperate with the target filtering model #a to perform speech recognition on speech data subsequently collected by the pickup device #1. If the speech recognition engine #A is not changed and the pickup device #1 is replaced with a pickup device #2, and if the speech recognition engine #A and the target filtering model #a are used to process speech data collected by the sound pickup device #2, an obtained recognition result may be inaccurate. In this case, a target filtering model adapted to the speech recognition engine #A and the pickup device #2 needs to be obtained based on the sound pickup device #2 and the speech recognition engine #A. That "the target filtering model #a is obtained based on the speech recognition engine #A and the pickup device #1" may be understood as "obtaining a plurality of syllable distances after the speech recognition engine #A performs recognition processing on speech data collected by the pickup device #1, and obtaining the target filtering model #a by training based on the plurality of syllable distances".

In an embodiment, for a same speech recognition engine, in a filtering model training process, different target filtering models may be obtained if different pickup devices are used to collect speech data. That is, a pickup device, a speech recognition engine, and a target filtering model adapt to each other. In a training process, training is performed based on a specific type of pickup device, and when the target filtering model is subsequently used, speech data needs to be collected based on this type of pickup device.

It should be understood that, in this embodiment of this application, it may be considered that speech data collected by a pickup device is the same as speech data output by the pickup device.

2. The target filtering model and the speech recognition engine are used to perform recognition processing on speech data collected in a "specific device environment".

The "specific device environment" is specifically a device environment in which the speech data of the original corpus corresponding to the $i^{th}$ syllable pair is collected. In other words, the "specific device environment" may be understood as a device environment that is used to collect speech data during filtering model training.

For example, the target filtering model #a is obtained based on the speech recognition engine #A and a device environment #I. The speech recognition engine #A, the device environment #I, and the target filtering model #a adapt to each other. The speech recognition engine #A may cooperate with the target filtering model #a to process speech data collected in the device environment #I. If the speech recognition engine #A is not changed, the device environment #I is replaced with a device environment #II. If the speech recognition engine #A cooperates with the target filtering model #a to process speech data collected in the device environment #II, an obtained recognition result may be inaccurate. In this case, a target filtering model adapted to the speech recognition engine #A and the device environment #II needs to be obtained based on the device environment #II and the speech recognition engine #A. That "the target filtering model #a is obtained based on the speech recognition engine #A and the device environment #I" may be understood as "obtaining a plurality of syllable distances after the speech recognition engine #A performs recognition processing on the speech data collected in the device environment #I, and obtaining the target filtering model #a by training based on the plurality of syllable distances".

In an embodiment, for a same speech recognition engine, in a filtering model training process, different target filtering models may be obtained if speech data is collected in different device environments. That is, a device environment, a speech recognition engine, and a target filtering model adapt to each other. In a training process, a filtering model is trained in a device environment, and when the target filtering model is subsequently used, speech data is collected in the device environment.

Optionally, it is assumed that the speech recognition engine is applied to in-vehicle speech recognition, and the device environment may include a vehicle cabin environment. In an embodiment, for a same speech recognition engine, different target filtering models may be obtained if speech data is collected in different cabin environments. That is, the cabin environment (device environment), the speech recognition engine, and the target filtering model adapt to each other. In a training process, training is performed in a specific device environment, and speech data is subsequently collected in the device environment.

3. The target filtering model and the speech recognition engine are used to perform recognition processing on speech data collected by a "specific pickup device" in a "specific device environment".

For the "specific device environment" and the "specific pickup device", refer to the foregoing related descriptions. That is, in this embodiment of this application, a pickup device, a device environment, a speech recognition engine, and a target filtering model adapt to each other. If any one of the pickup device, the device environment, the speech recognition engine, and the target filtering model is changed, filtering model training needs to be performed again, to obtain a target filtering model adapted to the other three.

In an example in which the device environment is a cabin environment, a speech recognition engine applied to a car is the same as that applied to a truck, and a pickup device applied to the car is the same as that applied to the truck. Because a cabin environment of the car is different from that of the truck, target filtering models that adapt to the cabin environments of the car and the truck need to be separately obtained.

Further, optionally, for a same speech recognition engine, a same pickup device, and a same device environment, a universal target filtering model may be used. For example, device environments of a vehicle #A and a vehicle #B are the same (for example, the vehicle #A and the vehicle #B are of a same model and a same brand), speech recognition engines applied to the vehicle #A and the vehicle #B are the same, and pickup devices applied to the vehicle #A and the vehicle #B are the same. In a cabin environment of the vehicle #A, a target filtering model obtained based on the speech recognition engine and the sound pickup device that are applied to the vehicle #A may be applied to the vehicle #B for speech recognition.

FIG. 3 is a schematic diagram of an example of a filtering model training system according to an embodiment of this application. As shown in FIG. 3, the system 200 may include a pickup device 210, a filtering model 220, and a speech recognition engine 230. In in-vehicle speech recognition, optionally, the system 200 may further include a loudspeaker 201, and the loudspeaker 201 is configured to play an original corpus.

To better simulate a place of articulation of a driver, the loudspeaker 201 may be assembled at a head position of a driver seat. Alternatively, loudspeakers 201 at a plurality of positions inside a vehicle can be controlled using a directional sound reproduction technology such that sound output by the loudspeakers 201 is superimposed and has special directivity.

Further, the loudspeaker 201 plays an original corpus, and the pickup device 210 collects speech data of the original corpus and inputs the speech data into the first filtering model 220. The filtering model 220 processes the input speech data, and inputs a processing result to the speech recognition engine 230, and the speech recognition engine 230 outputs a recognition result. Based on the system 200, a syllable distance corresponding to a syllable pair can be obtained.

In the same manner, N syllable distances corresponding to N syllable pairs may be obtained based on the system 200. After the N syllable distances are obtained, the filtering model 220 may be trained based on the N syllable distances, to obtain a target filtering model adapted to the speech recognition engine 230.

Further, optionally, the target filtering model may adapt to different working conditions.

Specifically, the target filtering model and the speech recognition engine are applied to a first device, and variables of a model algorithm of the target filtering model include a working condition variable corresponding to the first device. In other words, in a filtering model training process, an input into the filtering model may include speech data and a working condition variable value corresponding to a working condition for collecting the speech data. Optionally, the first device may be a vehicle, and the working condition variable corresponding to the first device is a working condition variable corresponding to the vehicle.

Based on this, the input into the target filtering model not only includes the speech data collected by the pickup device, but also may include the working condition variable value.

For example, it is assumed that the loudspeaker plays "da kai kong tiao" in a first working condition. A working condition variable value in the first working condition and speech data that is collected by the pickup device and that corresponds to "da kai kong tiao" are input into the target filtering model. The speech data that is collected by the pickup device and that corresponds to "da kai kong tiao" is an object on which the first filtering model performs filtering processing, and the working condition variable value in the first working condition is used for conditioning of the target filtering model.

It can be learned from the foregoing description that, in order to obtain the target filtering model by training, the original corpus and a recognition result corresponding to the original corpus need to be learned. The recognition result may be obtained by output by the speech recognition engine. Optionally, the original corpus corresponding to the recognition result may be obtained in at least one of the following manners.

Manner #1.

The original corpus corresponding to the $i^{th}$ syllable pair is (or belongs to) a corpus sample that is predefined for training a filtering model. The original corpus and the recognition result corresponding to the original corpus may be determined according to a specific rule.

A loudspeaker may play a calibration corpus according to a specific rule or a user reads the corpus sample according to a specific rule such that the original corpus and the recognition result corresponding to the original corpus can be obtained.

In an optional example, a calibration script records at least one corpus sample, and the original corpus may be obtained based on to the calibration script.

For example, each row of the calibration script is a text, and each text corresponds to a corpus sample. For example, a first row of the calibration script records "da kai kong tiao", and a second row records "da kai the Chuang". The original corpus and the recognition result corresponding to the original corpus are determined based on the calibration corpus according to a specific rule.

Optionally, the N syllable pairs may correspond to M original corpora, where 1≤M≤N. It should be understood that the first device corresponds to a plurality of working conditions, and original corpora played by the loudspeaker in the plurality working conditions may include a same corpus. For example, the loudspeaker plays "da kai shou yin ji" (which means "turn on FM radio" in English) in each working condition. In this case, M is less than N.

Optionally, there is a correspondence between a working condition and an original corpus, and the M original corpora corresponding to a working condition may be determined based on the working condition of the device.

Optionally, the M original corpora are determined from a plurality of corpus samples based on at least one of user language preference information and a type of a syllable included in the corpus samples.

Further, the M original corpora may be selected from the plurality of corpus samples based on a user language preference (for example, a higher frequency at which a user uses a corpus indicates that the corpus is more likely to be selected) and a syllable diversity (for example, more syllables included in the corpus indicate that the corpus is more likely to be selected).

In an optional example, at least one of the M original corpora that are used for training a filtering model may be determined according to the following formula $$\eta(r)=w_f \times f(r)+w_c \times c(r) \quad (1)$$

where $w_f$ indicates a weight of a user language preference, f (r) indicates a score of a user language preference for an $r^{th}$ corpus sample, $w_c$ indicates a weight of a syllable diversity, c (r) indicates a score of a syllable diversity of the $r^{th}$ corpus, and η (r) indicates a comprehensive score of the $r^{th}$ corpus. At least one corpus sample with a relatively high comprehensive score may be selected from the corpus samples according to the formula (1) as the at least one original corpus used for model training.

Optionally, a $(j+k)^{th}$ original corpus in the M original corpora is determined from the plurality of corpus samples based on a $j^{th}$ original corpus, and the $j^{th}$ original corpus is an original corpus in the M original corpora, where k≥1, and 1≤M≤N.

For example, the $(j+k)^{th}$ original corpus is further determined from the plurality of corpus samples based on at least one of a recognition state of speech data of the $j^{th}$ original corpus and a syllable distance between the $j^{th}$ original corpus and the $(j+k)^{th}$ original corpus.

Specifically, if the $j^{th}$ original corpus is correctly recognized (in an embodiment, a syllable distance between the $j^{th}$ original corpus and a recognition result corresponding to the $j^{th}$ original corpus is equal to 0), it indicates that a syllable included in the $j^{th}$ original corpus is not distorted. When the $(j+k)^{th}$ original corpus is to be selected, a corpus sample formed by a syllable different from that of the $j^{th}$ original corpus as far as possible may be selected, for example, a corpus sample with a syllable distance from the $j^{th}$ original corpus as large as possible is selected. If the $j^{th}$ original corpus is not correctly recognized (in an embodiment, the syllable distance between the $j^{th}$ original corpus and the recognition result corresponding to the $j^{th}$ original corpus is not equal to 0), a corpus sample formed by a syllable similar to that of the $j^{th}$ original corpus may be selected, for example, a corpus sample with a syllable distance from the $j^{th}$ original corpus as small as possible is selected such that the filtering module further learns a possible distortion.

In an optional example, if the $j^{th}$ original corpus is correctly recognized, the $(j+k)^{th}$ original corpus may be determined according to the following formula $$\eta(r)=w_s \times s(j)+w_f \times f(r)+w_c \times c(r) \quad (2).$$

For parameters in the formula (2), refer to related descriptions of the parameters in the formula (1). In the formula, $w_s$ represents a weight of a syllable distance, and s (j) represents the syllable distance between the $(j+k)^{th}$ original corpus and the $j^{th}$ original corpus. A corpus sample with a highest comprehensive score may be selected from the corpus samples according to the formula (2) as the $(j+k)^{th}$ original corpus.

Optionally, if the $j^{th}$ original corpus is not correctly recognized, the $(j+k)^{th}$ original corpus may be determined according to the following formula $$\eta(r)=-w_s \times s(j)+w_f \times f(r)+w_c \times c(r) \quad (3).$$

For parameters in the formula (3), refer to related descriptions of the parameters in the formula (2). A corpus sample with a highest comprehensive score may be selected from the corpus samples according to the formula (3) as the $(j+k)^{th}$ original corpus.

The $(j+k)^{th}$ original corpus is determined based on the $j^{th}$ original corpus, and the method for dynamically selecting the original corpus helps to select an appropriate original corpus, and helps to improve model training efficiency and shorten a model training time.

It can be known from the foregoing that, when an original corpus is to be subsequently selected, at least one of the following factors may be considered a recognition status of speech data of a current original corpus, a syllable distance between a corpus sample and the current original corpus, a quantity of syllable diversities (diversity) included in the corpus sample, a user language preference, and the like.

Selecting the original corpus helps improve the model training efficiency, and helps shorten the model training time.

Manner #2.

The original corpus is obtained based on a user instruction.

Specifically, the method 100 may further include obtaining a first user instruction, where the first user instruction is a speech instruction, obtaining a second user instruction within a preset time period after the first user instruction is obtained, where the second user instruction is a speech instruction or a manual instruction, and if the second user instruction and the first user instruction correspond to a same user actual intention, determining a first syllable distance corresponding to a first syllable pair, where the first syllable pair is one of the N syllable pairs, a first syllable in the first syllable pair is a syllable of a corpus corresponding to the second user instruction, and a second syllable in the first syllable pair is a syllable of a recognition result corresponding to the first user instruction. That is, the corpus corresponding to the second user instruction is an original corpus of the first user instruction.

It should be understood that, the preset time period is used to associate a causal relationship between the first user instruction and the second user instruction.

Optionally, determining whether the second user instruction and the first user instruction correspond to the same user actual intention may include determining whether corpora corresponding to the second user instruction and the first user instruction meet a true value condition. For example, meeting the true value condition may include meeting the following inequality $$0<D<TH \text{ or } 0<D\leq TH \quad (4)$$

where D represents a syllable distance between the syllable of the recognition result corresponding to the first user instruction and the syllable of the corpus corresponding to the second user instruction, and TH is a third threshold.

For example, a system detects a speech input corresponding to the first user instruction, and obtains a recognition result $u=\{w_1, \ldots, w_m\}$ obtained based on the speech input, where $w_q$ (q=1, ..., m) is a single Chinese character, and m is a total quantity of characters in the speech input. A syllable sequence of u may be represented as $p_u = \{p_{11}, \ldots, p_{mt}\}$ based on a correspondence between a Chinese character and a syllable, where $p_{ij}$ represents a $j^{th}$ syllable of an $i^{th}$ Chinese character. It is assumed that in preset duration after the user speech input, the system detects the second user instruction, and the corpus corresponding to the second user instruction is $\hat{u}=\{\hat{w}_1, \ldots, \hat{w}_m\}$, and a syllable sequence of $\hat{u}$ may be represented as $p_{\hat{u}} = \{p_{11}, \ldots, p_{mt}'\}$. If a length of $p_u$ is different from that of $p_{\hat{u}}$, to calculate a syllable distance between $p_u$ and $p_{\hat{u}}$, the lengths of the two syllable sequences may be the same by filling a mute syllable ε. Optionally, syllables of two sequences may be aligned according to a DTW open-source algorithm.

It is assumed that lengths of aligned and filled syllable sequences is N, and the syllable distance D between the two sequences $p_u$ and $p_{\hat{u}}$ may meet the following formula $$D = \sum_{i=1}^{N} dist(p_i^u, p_i^{\hat{u}}), p_i^u \in p_u, p_i^{\hat{u}} \in p_{\hat{u}} \quad (5)$$

where dist (•) represents a syllable distance, and a value of dist (•) may be determined according to a preset syllable distance rule. If D is greater than 0 and less than the third threshold, it may be determined that the corpus corresponding to the second user instruction meets the true value condition.

In an optional example, the second user instruction is a manual instruction, and if the corpus corresponding to the second user instruction meets the true value condition, it may be determined that the corpus corresponding to the second user instruction is the original corpus of the first user instruction.

For example, the system detects the speech input corresponding to the first user instruction, and recognition processing is performed on the first user instruction to obtain a recognition result u. In the preset time period, the system detects the second user instruction, and the system may obtain, using a vehicle sensor, the corpus (the user actual intention) corresponding to the second user instruction. The user actual intention is a predefined limited enumeration set, such as "tian chuang kong zhi" (which means "control a skylight") and "kong tiao tiao wen" (which means "adjust a temperature of an air conditioner"). Vehicle sensor data includes controller local area network (CAN) bus data, a user click and position coordinate data captured on a touchscreen by an infotainment system, user gesture data and vehicle camera data captured by an infrared sensor, and the like. After the second user instruction is obtained, the corpus corresponding to the second user instruction may be denoted as $\hat{u}$, and a syllable distance D between $\hat{u}$ and the recognition result u is calculated. If D meets the true value condition, the second user instruction and the first user instruction correspond to the same user actual intention, and the corpus corresponding to the second user instruction is the original corpus of the recognition result corresponding to the first user instruction.

In another optional example, the second user instruction is a speech instruction, and if the corpus corresponding to the second user instruction meets the true value condition and a third user instruction that meets the true value condition is not received in a preset time period after the second user instruction, it may be determined that the corpus corresponding to the second user instruction is the original corpus of the first user instruction.

For example, if a syllable distance between the syllable of the recognition result obtained after the recognition processing is performed on speech data corresponding to the first user instruction and the syllable of the corpus corresponding to the second user instruction is less than or equal to the third threshold, and the third user instruction is not obtained in the preset time period after the second user instruction is obtained, it is determined that the second user instruction and the first user instruction correspond to the same user actual intention. The syllable distance between the syllable of the recognition result obtained after the recognition processing is performed on the speech data corresponding to the first user instruction and a syllable of a corpus corresponding to the third user instruction is less than or equal to the third threshold.

It may be considered that obtaining the target filtering model in the manner #1 is an offline filtering model training method. In this method, the loudspeaker may play an original corpus based on a corpus sample such that recognition processing is performed on speech data played by the loudspeaker, to obtain a target filtering model adapted to the speech recognition engine. In an example of a vehicle, the target filtering model may be obtained by training before the vehicle is delivered from a manufacturer.

It may be considered that obtaining the target filtering model in the manner #2 is an online filtering model training method. In the method, an original corpus corresponding to a recognition result may be determined based on a user correction behavior (manual correction or speech correction) such that recognition processing is performed on speech data played by the loudspeaker, to obtain a target filtering model adapted to the speech recognition engine. In an example of a vehicle, the target filtering model may be obtained by training by a user in a vehicle use phase after the vehicle is delivered from a manufacturer.

The foregoing describes the method in the embodiments of this application from an overall perspective. Step 120 may include a plurality of implementations. The following describes step 120 in detail.

FIG. 4 is a schematic diagram of another example of a filtering model training system according to an embodiment of this application. As shown in FIG. 4, the system 300 includes a filtering model 310 and a scoring model 320.

The filtering model 310 may include at least one recurrent neural network (RNN) unit. For example, the filtering model 310 may include at least one gated recurrent unit (GRU) unit or long short-term memory (LSTM) unit. The scoring model 320 may include at least one regression model (or a neural network). For example, the scoring model 320 may include at least one linear regression model (or a feedforward deep neural network).

As shown in FIG. 3, an input into the filtering model 310 may include an output $h_j$ of a pickup device, and $h_j$ may be a time domain feature or a frequency domain feature of a $j^{th}$ (j=1, . . . , t) speech frame output by the pickup device.

Optionally, the input into the filtering model 310 may further include a working condition variable value. It should be understood that, during model training, the working condition variable value may be used for conditioning on the filtering model. For example, the working condition variable value may be used as an initial value of a unit state and input into the filtering model, to perform conditioning on the filtering model. For example, in a vehicle, at least one of parameters such as a vehicle speed, a vehicle window status, a road type, an air conditioner status, and a rain wiper status may be input into the filtering model, to perform conditioning on the filtering model.

As shown in FIG. 3, an input $y_j$ of the scoring model 320 may be an output of the filtering model 310, and an output of the scoring model 320 is a scalar value $s_j$. In this embodiment of this application, $s_j$ may represent a distance between a syllable of a recognition result of the speech data $y_j$ of the speech recognition engine and a syllable corresponding to an original corpus.

In an architecture shown in FIG. 3, each speech frame corresponds to a syllable distance. However, one syllable usually corresponds to a plurality of speech frames, and additional processing needs to be performed to determine a correspondence between a speech frame and a syllable.

For example, for an original speech signal generated during text to speech (TTS), articulation duration of each character may be controlled using a parameter. Duration of each syllable may be calculated based on the articulation duration and a common articulation habit (for example, a ratio of a length of each syllable to an entire articulation duration). In an example of "da kai kong tiao", it is assumed that articulation duration of each character is controlled using a TTS parameter "da (da)" 0.4 second, "kai (kai)" 0.5 second, "kong (kong)" 0.4 second, and "tiao (tiao)" 0.3 second. It is assumed that a common articulation habit is that ratios of an initial consonant, a single vowel, and a compound vowel are the same, and then a time length occupied by each syllable may be calculated as follows d (da): 0.4×½=0.2 s
a (da): 0.4×½=0.2 s
k (kai): 0.5×½=0.25 s
ai (kai): 0.5×½=0.25 s
k (kong): 0.4×½=0.2 s
ong (kong): 0.4×½=0.2 s
t (tiao): 0.3×⅓=0.1 s
i (tiao): 0.3×⅓=0.1 s
ao (tiao): 0.3×⅓=0.1 s.

Generally, the speech recognition engine can support uploading audio using a frame flow, in other words, a speech frame can be uploaded to the speech recognition engine. The speech recognition engine may return a text result. In this mode, the speech frame may be associated with the returned text. For example, audio of "da kai kong tiao" is uploaded using a frame flow to the speech recognition engine for speech recognition. The speech recognition engine returns a Chinese character "da" at 0.3 second, and all speech frames in the first 0.3 second may be associated with "da". At 0.6 second, the speech recognition engine returns a Chinese character "ke", that is, "kai" is incorrectly recognized as "ke". In this case, all speech frames from 0.3 s to 0.6 s may be associated with "ke". Further, a correspondence between a speech frame and a syllable may be determined according to the pronunciation habit described above.

For example, in the 0.3-second speech frames associated with "da", each speech frame in the first 0.15 second corresponds to a syllable "d", and each speech frame in the last 0.15 second corresponds to a syllable "a". For example, in the 0.3-second speech frames associated with "ke", each speech frame in the first 0.15 second corresponds to a syllable "k", and each speech frame in the last 0.15 second corresponds to a syllable "e".

In this solution, each speech frame corresponds to a syllable distance, and a syllable distance has a relatively fine granularity. In this solution, at least one of the scoring model and the filtering model can be better trained. However, in this solution, a speech frame and a syllable need to be processed (as described above), and consequently, an additional calculation load is increased, and alignment error values may be caused. Based on this, a pooling layer may be used to eliminate an alignment requirement between a speech frame and a syllable.

Figure 5:
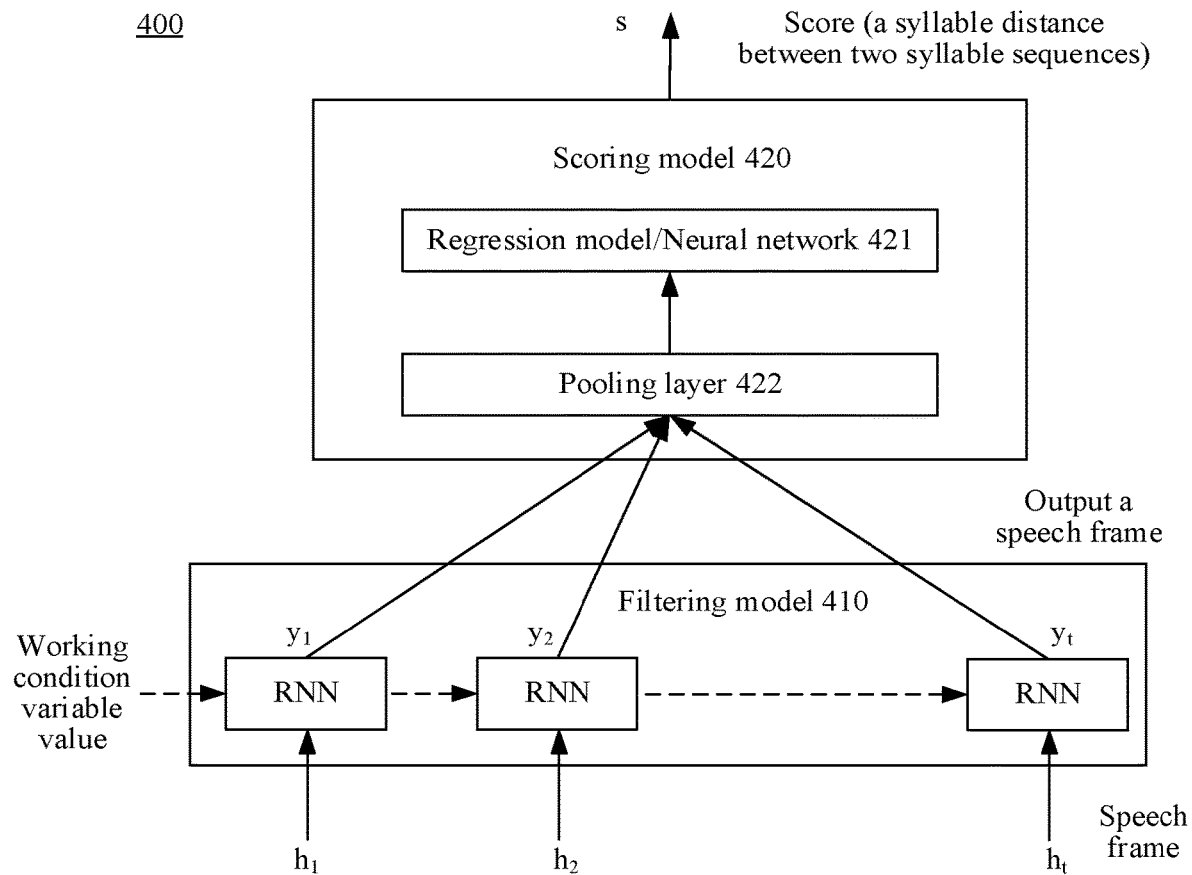
FIG. 5 is a schematic diagram of still another example of a filtering model training system according to an embodiment of this application.

FIG. 5 is a schematic diagram of still another example of a filtering model training system according to an embodiment of this application. As shown in FIG. 5, the system 400 includes a filtering model 410 and a scoring model 420.

For detailed descriptions of the filtering model 410, refer to the foregoing related descriptions of the filtering model 310. The scoring model 420 includes at least one regression model or neural network 421, and the scoring model 420 further includes a pooling layer 422.

The pooling layer 422 may use an average pooling layer or a max pooling layer. An output of the pooling layer 422 enters the regression model (or neural network) 421, and an output of the scoring model 420 is a scalar value s, where s may represent a syllable distance between an original corpus and a recognition result corresponding to the original corpus. In other words, in the system architecture 400, the output of the scoring model 420 may represent a syllable distance between two syllable sequences (or two corpora).

The pooling layer is introduced, and syllable alignment does not need to be considered at a speech frame layer, thereby reducing algorithm complexity. Other steps are the same as those described above.

In other words, if the system 300 is used, the first syllable may be a syllable, the second syllable may be a syllable, and speech data of a corpus corresponding to the $i^{th}$ syllable pair may be one speech frame.

If the system 400 is used, the first syllable may be a syllable sequence, the second syllable may be a syllable sequence, and speech data of a corpus corresponding to the $i^{th}$ syllable may include a plurality of speech frames.

That is, if the system 300 described in FIG. 4 is used, each speech frame may correspond to one syllable distance. If the system 400 described in FIG. 5 is used, a plurality of speech frames of each original corpus (for example, each character, each word, or each sentence) may correspond to one syllable distance.

Figure 6:
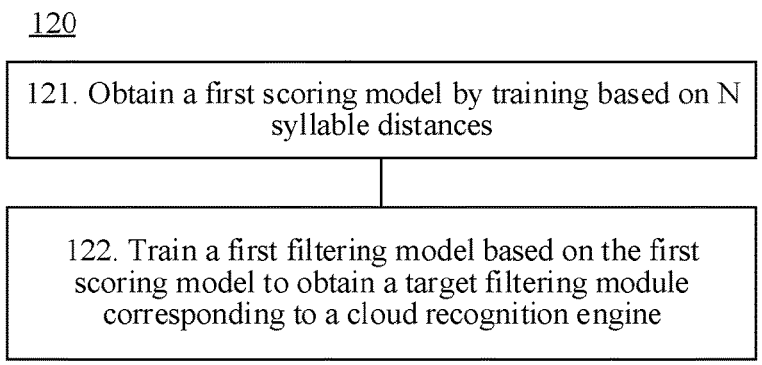
FIG. 6 is a schematic flowchart of another example of a filtering model training method according to an embodiment of this application.

FIG. 6 is a schematic flowchart of another example of a filtering model training method according to an embodiment of this application. As shown in FIG. 6, 120 may include the following steps.

121. Obtain a first scoring model by training based on the N syllable distances.

A scalar value output by the first scoring model is used to indicate a syllable distance between an original syllable and a recognized syllable corresponding to the original syllable. The original syllable is a syllable of an original corpus, and the recognized syllable is a syllable of a recognition result obtained after the speech recognition engine processes speech data. For example, the speech data of the original corpus corresponding to the $i^{th}$ syllable pair is processed by the first filtering model and then input into the first scoring model, to obtain a scalar value used to represent a syllable distance corresponding to the $i^{th}$ syllable pair.

It should be understood that the obtaining the first scoring model by training may be understood as training a scoring model, to obtain the first scoring model. In a scoring model training process, an input into the scoring model may be an output of the first filtering model. Optionally, the first filtering model may include one of the following several types.

(1) The first filtering model may be an initialized filtering model.

For example, a transfer function of the filtering model may be initialized to a unit function. In an embodiment, the transfer function of the first filtering model is a unit function, and the first filtering model may not process an input speech frame.

(2) The first filtering model may be a conventional high-pass filter.

It should be noted that regardless of a filtering model of the first filtering model, in a process of obtaining the first scoring model by training, a model parameter (or a weight) of the first filtering model remains unchanged.

It should be understood that, in this embodiment of this application, each of the N syllable distances is a syllable distance between an original corpus and a recognition result corresponding to the original corpus, and an objective of training the scoring model is to minimize an error value between a scalar value output by the scoring model and the syllable distance. In other words, a purpose of training the scoring model is to obtain the first scoring model used for fitting (or simulating) a syllable distance between an original syllable and a recognized syllable.

Optionally, the N syllable distances are in a one-to-one correspondence with N first scalar values output by the first scoring model, and subtraction is separately performed between the N syllable distances and the N first scalar values to obtain N error values. An average value of the N error values is less than or equal to a first threshold. An $i^{th}$ first scalar value in the N first scalar values is a scalar value obtained after the speech data of the original corpus corresponding to the $i^{th}$ syllable pair is processed by the first filtering model and then is input into the first scoring model. The $i^{th}$ syllable pair and the $i^{th}$ first scalar value correspond to a same syllable distance.

It should be understood that the average value in this embodiment of this application may be an arithmetic average value, a geometric average value, a square average value, a mean square average value, a harmonic average value, a weighted average value, or the like. In this embodiment of this application, the average value of the error values between the first scalar values output by the first scoring model and the syllable distances corresponding to the syllable pairs is less than or equal to the first threshold. It may be considered that a scalar value output by the first scoring model may be used to indicate a syllable distance (or an error) between an original syllable and a recognized syllable.

Further, the first scoring model may be obtained by training based on the N syllable distances in one of a plurality of manners.

For example, a scoring model S $(y, \theta_s)$ may be defined as a differentiable function, where y represents an output of a filtering model. In a scoring model training process, y may specifically represent the output of the first filtering model, and $\theta_s$ represents a model parameter (or a weight) of the scoring model. An output of S $(y, \theta_s)$ is a scalar value. A purpose of training the scoring model is to obtain the first scoring model used for fitting (or simulating) a syllable distance between an original syllable and a recognized syllable. The scoring model training may be understood as adjusting a model parameter of a scoring model in a scoring model algorithm.

An error value between a scalar value output by a current scoring model and a corresponding syllable distance may be determined according to the following formula $$e_s(i)=z(i)-S(y(i),\theta_s) \quad (6)$$

where z (i) represents the syllable distance corresponding to the $i^{th}$ syllable pair, S (y (i), $\theta_s$) represents a scalar value obtained after the speech data of the original corpus corresponding to the $i^{th}$ syllable pair is processed by the first filtering models and then is input into the current scoring model, y (i) represents an output obtained after the first filtering model processes the speech data of the original corpus corresponding to the $i^{th}$ syllable, Os represents a model parameter of the current scoring model, and $e_s$ (i) represents an error value between the syllable distance corresponding to the $i^{th}$ syllable pair and the scalar value obtained after the speech data of the original corpus corresponding to the $i^{th}$ syllable pair is processed by the first filtering models and then is input into the first scoring model.

For example, it is assumed that an $i^{th}$ original corpus is "da kai kong tiao", and speech data that corresponds to "da kai kong tiao" and that is output by the pickup device is processed by the first filtering model and then input into the speech recognition engine, to obtain "da ke kong tiao". The original corpus is "da kai kong tiao", a recognition result corresponding to the original corpus is "da ke kong tiao". According to Table 1, it may be determined that z (i)=0.2, and z (i)=0.2 is substituted into the formula (1). An error between "da kai kong tiao" and a scalar value obtained after the speech data corresponding to "da kai kong tiao" is processed by the first filtering model and then input into the current scoring model.

Optionally, the scoring model may be trained through mini-batch (min-batch) processing. Optionally, a quantity of batches may be determined based on a quantity of training corpora. For example, m original corpora may be used as one batch. For example, it is assumed that a $k^{th}$ (k≥1) batch originally includes m original corpora, and a mean square average value of error values in the $k^{th}$ batch of training corresponding to the scoring model may be expressed as $$E(\theta_s) = \frac{1}{m}\sum_{i=1}^{m} e_s(i)^2. \quad (7)$$

It should be understood that E ($\theta_s$) represents a mean square average value (or a mean square error value) of error values of the $k^{th}$ batch of training corresponding to the scoring model, and $e_s(i)$ may represent a difference between an $i^{th}$ syllable distance and an $i^{th}$ first scalar value, the $i^{th}$ syllable distance is a syllable distance between a syllable of the $i^{th}$ original corpus and a syllable of a recognition result corresponding to the $i^{th}$ original corpus, and the $i^{th}$ first scalar value is an error value between a scalar value obtained after the speech data corresponding to the $i^{th}$ original corpus is processed by the first filtering model and then input into the current scoring model.

The model parameter may be updated using a stochastic gradient descent method or a back propagation through time (BPTT) method. An updated value $\theta_s'$ of $\theta_s$ may meet the following formula $$\theta_s' = \eta \nabla E(\theta_s) \qquad (8)$$

where $\eta$ represents a learning rate hyper parameter, and $\nabla$ represents a gradient operator.

If $E(\theta_s')$ is greater than the first threshold, the stochastic gradient descent or the BPTT may be used to continue to update the $\theta_s'$.

If $E(\theta_s')$ is less than or equal to the first threshold, it may be determined that a scoring model based on $\theta_s'$ is a first scoring model, or scoring model convergence based on $\theta_s'$ may be determined. Optionally, scoring model convergence may be understood as a scoring model is trained based on a preset quantity of training corpora, a preset content of training corpora, or a preset quantity of syllable distances, to obtain a scoring model in which an average error value is less than or equal to the first threshold. It should be understood that the average error value is an average value of error values between scalar values output by a scoring model and corresponding syllable distances.

122. Train the first filtering model based on the first scoring model, to obtain the target filtering model.

The scalar value output by the first scoring model may be used to indicate a syllable distance between an original syllable and a recognized syllable. A smaller scalar value output by the first scoring model may indicate that an original syllable is closer to a recognized syllable corresponding to the original syllable (an error is smaller), that is, a recognition result of the speech recognition engine is more accurate. Based on this, the target filtering model may be obtained by training based on the first scoring model, to minimize a value output by the first scoring model that is based on the target filtering model.

Optionally, an average value of N second scalar values output by the first scoring model is less than or equal to a second threshold. The speech data of the original corpus corresponding to the $i^{th}$ syllable pair is processed by the target filtering model, and then input into the first scoring model, to obtain an $i^{th}$ second scalar value in the N second scalar values.

It should be understood that the foregoing first scalar value may be understood as a scalar value that is output by the scoring model based on the first filtering model. The second scalar value may be understood as a scalar value that is output by the first scoring model based on the target filtering model.

In this embodiment of this application, the first scoring model may be obtained by training based on the N syllable distances in one of a plurality of manners.

For example, a filtering model $F(x, \theta_f)$ may be defined as a differentiable function, where x may represent a speech data corresponding to an original corpus, or x includes the speech data corresponding to the original corpus and a working condition variable value. The working condition variable value is used for conditioning on a filtering model.

$\theta_f$ represents a model parameter of the filtering model. $F(x, \theta_f)$ represents an output of the filtering model. An objective of training the filtering model is to minimize the output of the first scoring model, that is, to minimize a syllable distance between an original syllable and a recognized syllable. Because the syllable distance is a non-negative value, the syllable distance is zero at a minimum.

Optionally, the target filtering model is obtained by training according to the following formula $$e_f(i) = S(F(x(i), \theta_f), \theta_{s\_T}) \qquad (9)$$

where $S(F(x(i), \theta_f), \theta_{s\_T})$ represents a scalar value obtained after speech data of original corpus corresponding to the $i^{th}$ syllable pair is processed by a current filtering model and then input into the first scoring model, $\theta_{s\_T}$ represents the model parameter of the first scoring model, $F(x(i), \theta_f)$ represents an output obtained after the current filtering model processes the speech data of the original corpus corresponding to the $i^{th}$ syllable pair, $\theta_f$ represents a model parameter of the current filtering model, and $x(i)$ represents the speech data of the original corpus corresponding to the $i^{th}$ syllable pair, or $x(i)$ represents the speech data of the original corpus corresponding to the $i^{th}$ syllable pair and a working condition variable value for collecting the speech data of the original corpus corresponding to the $i^{th}$ syllable pair.

Similar to the description, the filtering models may be trained by mini-batch processing. For detailed descriptions of the mini-batch processing, refer to the foregoing related descriptions. For example, it is assumed that a $k^{th}$ ($k \geq 1$) batch of training originally includes m original corpora, and a mean square average value of scalar values in the $k^{th}$ batch of training corresponding to the scoring model may be expressed as $$E(\theta_f) = \frac{1}{m} \sum_{i=1}^{m} e_f(i)^2 \qquad (10)$$

where $e_f(i)$ may represent a scalar value that is output by the first scoring model for the $i^{th}$ original corpus.

The model parameter may be updated using the stochastic gradient descent method or BPTT. An updated value $\theta_f'$ of $\theta_f$ may meet the following formula $$\theta_f' = \eta \nabla E(\theta_f) \qquad (11).$$

If $E(\theta_f')$ is greater than the second threshold, the stochastic gradient descent or the BPTT may be used to continue to update the $\theta_f'$.

If $E(\theta_f')$ is less than or equal to the second threshold, a filtering model based on $\theta_f'$ may be determined as a target filtering model, or filtering model convergence based on $\theta_f'$ may be determined. For the filtering model convergence, refer to the foregoing related description of the scoring model convergence. For brevity, details are not described herein again.

It should be noted that when the filtering model is trained based on the first scoring model, a model parameter of a neural network of the first scoring model needs to be frozen. There may be different implementations of freezing a model parameter of one or more layers of neural networks. A learning rate of the layer may be set to zero, or the model parameter of the layer may be associated with a relatively large regularization term, to punish a great change of the model parameter.

Based on the foregoing descriptions, in this embodiment of this application, a scalar value output by the first scoring model can indicate a syllable distance between an original syllable and a recognized syllable, the target filtering model is obtained by training based on the first scoring model, and the output of the first scoring model is minimized based on the target filtering model, which is equivalent to minimizing a syllable distance between the original syllable and the recognized syllable (or minimizing an error value between the original syllable and the recognized syllable). This helps to improve speech recognition accuracy.

It should be understood that the foregoing described possible implementation of obtaining the first scoring model by training based on the N syllable distance and then obtaining the target filtering model by training based on the first scoring model is merely a possible implementation of this application. For example, a scoring model and a filtering model may be trained at the same time such that the scoring model and the filtering model converge at the same time. Alternatively, the target filtering model is obtained by training based on the syllable distances in another manner.

Figure 7:
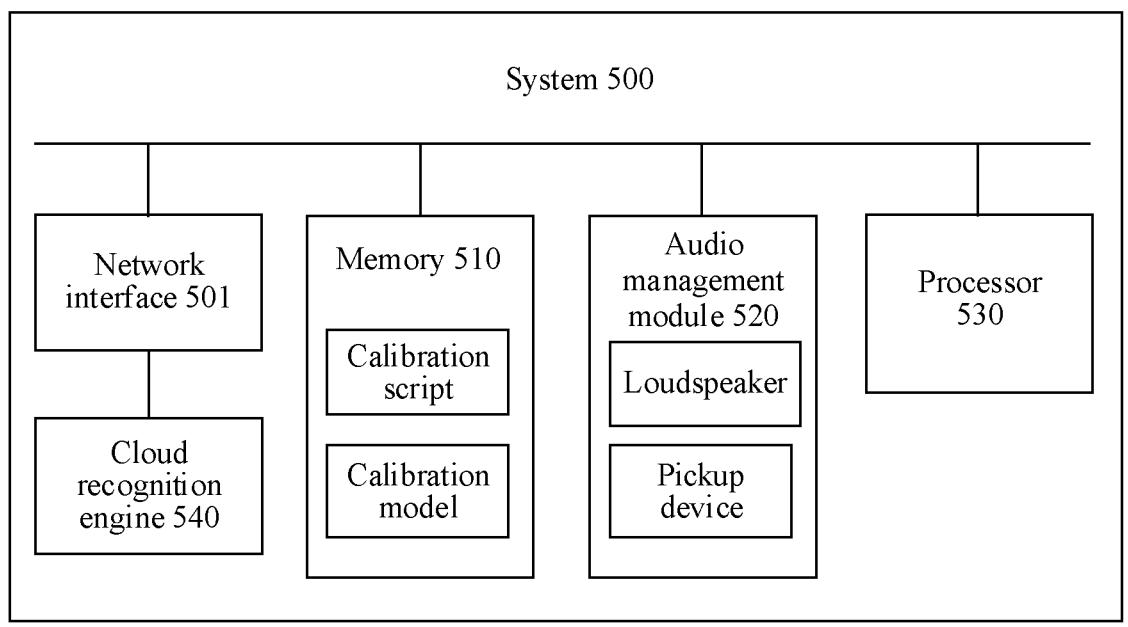
FIG. 7 is a schematic diagram of yet another example of a filtering model training system according to an embodiment of this application.

FIG. 7 is a schematic diagram of yet another example of a filtering model training system according to an embodiment of this application. As shown in FIG. 7, the system 500 includes a memory 510, an audio management module 520, a processor 530, and a speech recognition engine 540. The system 500 may further include a network interface 501.

The memory 510 stores a calibration script and a calibration model. The calibration model may include the foregoing filtering model and the foregoing scoring model. The audio management module 520 includes a loudspeaker and a pickup device.

Figure 8:
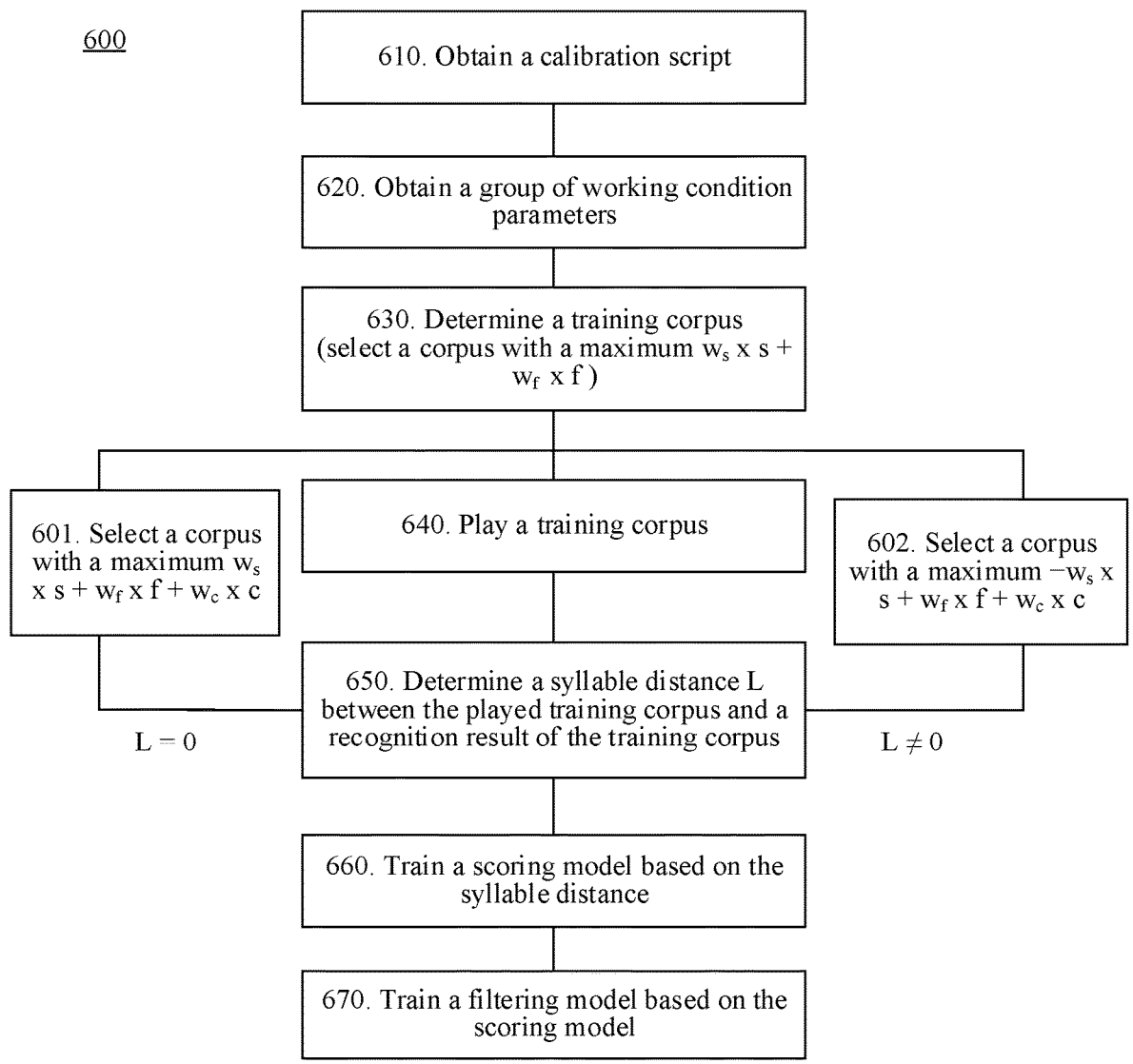
FIG. 8 is a schematic flowchart of still another example of a filtering model training method according to an embodiment of this application.

FIG. 8 is a schematic flowchart of still another example of a filtering model training method according to an embodiment of this application. It should be understood that FIG. 8 shows detailed steps or operations of a method 600. However, these steps or operations are merely an example. In this embodiment of this application, another operation may be further performed or only some of the operations in FIG. 8 may be performed. Optionally, the method 600 may be performed by the foregoing system 500. As shown in FIG. 8, the method 600 may include the following steps.

610. Obtain a calibration script.

The calibration script records a plurality of corpus samples. Optionally, the calibration script may further record a relationship between a working condition and a key-value pair of a calibration corpus, or the calibration script may further record a relationship between a working condition variable value and a key-value pair of a corpus sample.

620. Obtain a group of working condition variable values.

It is assumed that a target filtering model obtained by training using the method 200 is used for in-vehicle speech recognition. Optionally, a group of working condition variable values corresponding to a vehicle may be obtained, and the vehicle is controlled, based on the working condition variable values, to be in a working condition corresponding to the working condition variable values.

For example, the working condition variables corresponding to the vehicle includes a window state and a vehicle speed. The first group of working condition variable values include window opened and a vehicle speed 60 kilometers/hour. After the working condition variable values are obtained, the vehicle may be controlled to be in a working condition of window opened, and a vehicle speed 60 kilometers/hour.

630. Determine a training corpus.

It should be understood that the training corpus is a corpus used for model training, and the training corpus may be corresponding to the foregoing original corpus.

Optionally, the calibration script may record a combination of a working condition variable value and a key-value pair of a corpus sample, and the training corpus may be selected, based on the calibration script and the obtained working condition variable values, from the plurality of corpus samples recorded in the calibration script.

Optionally, the calibration script records the plurality of corpus samples, and one training corpus may be selected from the plurality of corpus samples. For ease of description, the training corpus may be denoted as a "training corpus #1".

Optionally, the "training corpus #1" may be selected from the at least one corpus sample based on at least one of a type of a syllable included in the corpus sample and a user language preference. For example, the training corpus #1 may be selected according to the formula (1). For example, a comprehensive score of each corpus sample is calculated according to the formula (1), and a corpus sample with a highest comprehensive score is determined as the training corpus #1.

640. Play the selected training corpus. For example, the training speech #1 is played.

Further, the loudspeaker may play the training corpus. For related descriptions about playing the training corpus by the loudspeaker, refer to the foregoing related descriptions. For brevity, details are not described herein again.

650. Determine a syllable distance L between the played training corpus and a recognition result of the training corpus.

It should be understood that in 650, it may be determined whether a speech recognition engine can correctly recognize the training corpus #1.

660. Train a scoring model based on the syllable distance.

670. Train a filtering model based on the scoring model.

Optionally, the method may further include the following steps.

601. If L=0, select a corpus with a maximum comprehensive score as a next training corpus according to the formula (2), and continue to perform 640.

602. If L=0, select a corpus with a maximum comprehensive score as a next training corpus according to the formula (3), and continue to perform 640.

It should be understood that the method described above are merely a possible implementation of this embodiment of this application, and the method in this embodiment of this application may alternatively be implemented in another manner, provided that all target filtering models adapted to the speech recognition engine that are obtained by training the filtering model using a recognition result of the speech recognition engine fall within the scope of this embodiment of this application.

Figure 9:
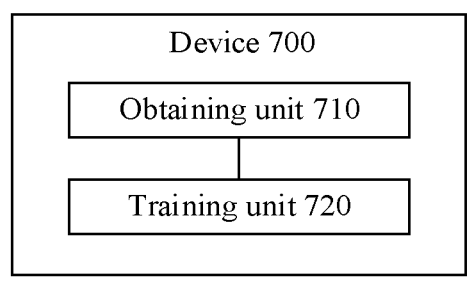
FIG. 9 is a schematic flowchart of an example of a filtering model training device according to an embodiment of this application.

FIG. 9 is a schematic diagram of an example of a filtering model training device according to an embodiment of this application. As shown in FIG. 9, the device 700 includes an obtaining unit 710 configured to obtain N syllable distances that are in a one-to-one correspondence with to N syllable pairs, where each syllable pair includes a first syllable and a second syllable, each syllable distance is a syllable distance between a first syllable and a second syllable in a corresponding syllable pair, a first syllable in an $i^{th}$ syllable pair is a syllable of an original corpus corresponding to the $i^{th}$ syllable pair, a second syllable in the $i^{th}$ syllable pair is a syllable of a recognition result obtained after recognition processing is performed on speech data of the original corpus corresponding to the $i^{th}$ syllable pair, the recognition processing includes processing based on a first filtering module and processing based on a speech recognition engine, the $i^{th}$ syllable pair is any one of the N syllable pairs, and N≥1, and a training unit 420 configured to train the first filtering model based on the N syllable distances to obtain a target filtering model corresponding to the speech recognition engine, where the speech recognition engine and the target filtering model are used for speech recognition.

Optionally, the training unit 420 is further configured to obtain a first scoring model by training based on the N syllable distances, where a scalar value output by the first scoring model is used to indicate a syllable distance between an original syllable and a recognized syllable corresponding to the original syllable, the original syllable is a syllable of an original corpus, and the recognized syllable is a syllable of a recognition result obtained after speech data is processed by the speech recognition engine, and train the first filtering model based on the first scoring model to obtain the target filtering model.

Optionally, the N syllable distances are in a one-to-one correspondence with N first scalar values output by the first scoring model, and subtraction is separately performed between the N syllable distances and the N first scalar values to obtain N error values. An average value of the N error values is less than or equal to a first threshold. An $i^{th}$ first scalar value in the N first scalar values is a scalar value obtained after the speech data of the original corpus corresponding to the $i^{th}$ syllable pair is processed by the first filtering model and then is input into the first scoring model. An average value of N second scalar values output by the first scoring model is less than or equal to a second threshold. An $i^{th}$ second scalar value in the N second scalar values is obtained after the speech data of the original corpus corresponding to the $i^{th}$ syllable pair is processed by the target filtering model and then is input into the first scoring model.

Optionally, the training unit 420 is further configured to obtain the first scoring model by training according to a formula $e_s(i) = z(i) - S(y(i), \theta_s)$, where $z(i)$ represents a syllable distance corresponding to the $i^{th}$ syllable pair, S 0 represents a model algorithm of a scoring model, and $S(y(i), \theta_s)$ represents a scalar value obtained after the speech data of the original corpus corresponding to the $i^{th}$ syllable pair is processed by the first filtering model and then input into a current scoring model, $y(i)$ represents an output obtained after the speech data of the original corpus corresponding to the $i^{th}$ syllable pair is processed by the first filtering model, $\theta_s$ represents a model parameter of the current scoring model, and $e_s(i)$ represents an error value between the syllable distance corresponding to the $i^{th}$ syllable pair and the scalar value obtained after the speech data of the original corpus corresponding to the $i^{th}$ syllable pair is processed by the first filtering model and then input into the first scoring model, and obtain the target filtering model by training according to a formula $e_f(i) = S(F(x(i), \theta_f), \theta_{s\_T})$, where $S(F(x(i), \theta_f), \theta_{s\_T})$ represents a scalar value obtained after the speech data of the original corpus corresponding to the $i^{th}$ syllable pair is processed by a current filtering model and then input into the first scoring model, $\theta_{s\_T}$ represents a model parameter of the first scoring model, $F(\cdot)$ represents a model algorithm of a filtering model, $F(x(i), \theta_f)$ represents an output obtained after the speech data of the original corpus corresponding to the $i^{th}$ syllable pair is processed by the current filtering model, $\theta_f$ represents a model parameter of the current filtering model, and $x(i)$ represents the speech data of the original corpus corresponding to the $i^{th}$ syllable pair, or $x(i)$ represents the speech data of the original corpus corresponding to the $i^{th}$ syllable pair and a working condition variable value for collecting the speech data of the original corpus corresponding to the $i^{th}$ syllable pair.

Optionally, the target filtering model is used to perform filtering processing on speech data collected by a first pickup device, and the first pickup device collects the speech data of the original corpus corresponding to the $i^{th}$ syllable pair.

Optionally, the target filtering model is used to perform filtering processing on speech data collected in a first device environment, and the speech data of the original corpus corresponding to the $i^{th}$ syllable pair is collected in the first device environment.

Optionally, the target filtering model and the speech recognition engine are applied to a first device, and variables of a model algorithm of the target filtering model include a working condition variable corresponding to the first device.

Optionally, the speech data of the original corpus corresponding to the $i^{th}$ syllable pair is a corpus sample that is predefined for training a filtering model.

Optionally, the N syllable pairs correspond to M original corpora, a $(j+k)^{th}$ original corpus in the M original corpora is determined from a plurality of corpus samples based on a $j^{th}$ original corpus, and the $j^{th}$ original corpus is one of the M original corpora, where k≥1, and 1≤M≤N.

Optionally, the $(j+k)^{th}$ original corpus is further determined from the plurality of corpus samples based on at least one of a recognition state of speech data of the $j^{th}$ original corpus and a syllable distance between the $j^{th}$ original corpus and the $(j+k)^{th}$ original corpus.

Optionally, the N syllable pairs correspond to M original corpora, and the M original corpora are determined from a plurality of corpus samples based on at least one of user language preference information and a type of a syllable included in the corpus samples.

Optionally, the obtaining N syllable distances that are in a one-to-one correspondence with N syllable pairs includes obtaining a first user instruction, where the first user instruction is a speech instruction, obtaining a second user instruction in a preset time period after the first user instruction is obtained, where the second user instruction is a speech instruction or a manual instruction, if the second user instruction and the first user instruction correspond to a same user actual intention, determining a first syllable distance corresponding to a first syllable pair, where the first syllable is one of the N syllable pairs, a first syllable in the first syllable pair is a syllable of a corpus corresponding to the second user instruction, and a second syllable in the first syllable pair is a syllable of a recognition result obtained after the recognition processing is performed on speech data corresponding to the first user instruction.

Optionally, the second user instruction is a speech instruction, the device further includes, if a syllable distance between the syllable of the recognition result obtained after the recognition processing is performed on the speech data corresponding to the first user instruction and the syllable of the corpus corresponding to the second user instruction is less than or equal to a third threshold, and a third user instruction is not obtained in a preset time period after the second user instruction is obtained, it is determined that the second user instruction and the first user instruction correspond to a same user actual intention. The syllable distance between the syllable of the recognition result obtained after the recognition processing is performed on the speech data corresponding to the first user instruction and a syllable of a corpus corresponding to the third user instruction is less than or equal to the third threshold.

Optionally, the second user instruction is specifically a manual instruction, and the device further includes, if a syllable distance between the syllable of the recognition result obtained after the recognition processing is performed on the speech data corresponding to the first user instruction and the syllable of the corpus corresponding to the second user instruction is less than or equal to the third threshold, it is determined that the second user instruction and the first user instruction correspond to a same user actual intention.

Figure 10:
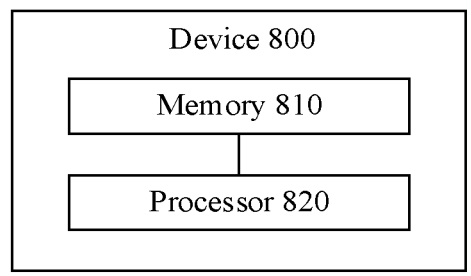
FIG. 10 is a schematic flowchart of another example of a filtering model training device according to an embodiment of this application.

FIG. 10 is a schematic diagram of another example of a filtering model training device according to an embodiment of this application. As shown in FIG. 10, the device 800 includes a memory 810 and a processor 820. The memory 810 is configured to store an instruction. The processor 820 is configured to execute the instruction stored in the memory 810. When the instruction is executed, the processor 810 is configured to perform the method provided in the foregoing method embodiment. Optionally, the device may further include a communications interface. The processor is further configured to control the communications interface to communicate with the outside.

It should be understood that the device 700 shown in FIG. 9 and the device 800 shown in FIG. 10 may be configured to perform operations and procedures in the method embodiments, and operations and/or functions of the units in the device 700 and the device 800 are separately intended to implement corresponding procedures in the method embodiments. For brevity, details are not described herein again.

It should be understood that, the processor in the embodiments of this application may be a central processing unit (CPU), or may be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory EEPROM), or a flash memory. The volatile memory may be a random access memory (RAM), used as an external cache. Through example but not limitative description, many forms of RAM may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that when the processor is a general-purpose processor, a DSP, an ASIC, an FPGA, or another programmable logic device, discrete gate, transistor logic device, or discrete hardware component, the memory (storage module) is integrated into the processor.

It should be noted that the memory described in this specification is intended to include but is not limited to these memories and any other proper type of memory.

All or some of the foregoing embodiments may be implemented by software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, device, and unit, refer to a corresponding process in the foregoing method embodiments, and details are not described herein again.

It should be understood that the term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A filtering model training method, comprising:
   performing speech recognition on sound signals of a corpus, wherein the speech recognition comprises filtering based on a filtering model and recognition processing;
   obtaining a first recognition result of the speech recognition on the sound signals of the corpus;
   obtaining N original syllables comprised in an actual pronunciation of the corpus, wherein N is an integer greater than or equal to 1;
   obtaining N recognized syllables from the first recognition result, wherein the N recognized syllables are in a one-to-one correspondence with the N original syllables;
   obtaining N syllable distances based on the N original syllables and the N recognized syllables, wherein the N syllable distances are in a one-to-one correspondence with N syllable pairs, wherein the N syllable pairs comprise the N original syllables and the N recognized syllables, and wherein each of the N syllable distances indicates a similarity between an original syllable of the N original syllables and a recognized syllable of the N recognized syllables in a corresponding syllable pair of the N syllable pairs; and
   training the filtering model based on the N syllable distances.

2. The filtering model training method of claim 1, further comprising:
   obtaining a scoring model based on the sound signals of the corpus and the N syllable distances;
   performing the speech recognition on sound signals of a third corpus;
   obtaining K syllable distances based on the scoring model and the sound signals of the third corpus, wherein an actual pronunciation of the third corpus comprises K original syllables, and wherein the K syllable distances are in a one-to-one correspondence with K syllable pairs;
   obtaining a third recognition result after the speech recognition is performed on the sound signals of the third corpus, wherein the third recognition result comprises K recognized syllables, wherein the K recognized syllables are in a one-to-one correspondence with the K original syllables, wherein the K original syllables and the K recognized syllables form the K syllable pairs, wherein each of the K syllable distances indicates a similarity between an original syllable of the K original syllables and a recognized syllable of the K recognized syllables comprised in a corresponding syllable pair of the K syllable pairs, and wherein K is an integer greater than or equal to 1; and
   training the filtering model based on the N syllable distances and the K syllable distances.

3. The filtering model training method of claim 1, further comprising:
   performing the speech recognition on sound signals of a second corpus, wherein the speech recognition comprises filtering based on the filtering model after training and recognition processing;
   obtaining a second recognition result of the speech recognition on the sound signals of the second corpus;
   training the filtering model such that a value of each of M syllable distances corresponding to the second corpus falls within a first preset range, wherein the M syllable distances are in a one-to-one correspondence with M syllable pairs, wherein M original syllables comprised in the M syllable pairs are in an actual pronunciation of the second corpus, and wherein M is an integer greater than or equal to 1.

4. The filtering model training method of claim 3, further comprising obtaining the sound signals of the corpus based on a first pickup device, wherein the first pickup device is configured to obtain the sound signals of the second corpus.

5. The filtering model training method of claim 1, wherein each of the N original syllables comprises at least one phoneme, wherein the filtering model training method further comprises:
   obtaining first mapping relationship information, wherein the first mapping relationship information indicates a phoneme distance between a plurality of phonemes, and wherein the phoneme distance between any two of the phonemes indicates a similarity between the any two of the phonemes; and
   obtaining the N syllable distances based on the first mapping relationship information.

6. The filtering model training method of claim 5, further comprising:
   obtaining W original phonemes comprised in the N original syllables;
   obtaining W recognized phonemes comprised in the N recognized syllables, wherein the W original phonemes are in a one-to-one correspondence with the W recognized phonemes, and wherein W is an integer greater than or equal to 1; and
   obtaining W phoneme distances based on the first mapping relationship information, wherein the W phoneme distances are in a one-to-one correspondence with W phoneme pairs, wherein each of the W phoneme distances is between phonemes in a corresponding phoneme pair, and wherein the corresponding phoneme pair comprises an original phoneme and a recognition phoneme that correspond to each other; and obtaining the N syllable distances based on the W phoneme distances.

7. The filtering model training method of claim 6, further comprising obtaining the N syllable distances based on an average value of the W phoneme distances.

8. The filtering model training method of claim 1, wherein when N is greater than or equal to 2 the filtering model training method further comprises:

obtaining an arrangement sequence and an articulation duration of the N original syllables;

obtaining moments of the N recognized syllables; and obtaining the N syllable pairs based on the arrangement sequence, the articulation duration, and the obtaining moments.

9. The filtering model training method of claim 1, further comprising:

obtaining environment information of a filtering model environment; and training the filtering model based on the N syllable distances and the environment information.

10. The filtering model training method of claim 9, wherein when the filtering model is configured in a vehicle, the environment information comprises at least one of vehicle speed information, information about whether a vehicle window is open or closed, or air volume information of an air conditioner.

11. The filtering model training method of claim 1, further comprising:

obtaining user information of a user that obtains the filtering model, wherein the user information comprises a frequency at which the user uses each of a plurality of corpora; and obtaining the corpus from the plurality of corpora.

12. The filtering model training method of claim 1, further comprising:

obtaining a first time range based on a plurality of obtaining moments of the N recognized syllables;

obtaining a first event that occurs in the first time range; and obtaining syllables corresponding to the first event as the N original syllables based on second mapping relationship information, wherein the second mapping relationship information indicates the syllables corresponding to a plurality of events comprising the first event.

13. The filtering model training method of claim 12, wherein the first time range comprises a first preset duration that starts from one of the obtaining moments, wherein at least one candidate event occurs in the first time range, or the first time range is based on an occurrence time of a plurality of candidate events, wherein an occurrence time interval between any two of the plurality of candidate events is less than or equal to a second preset duration, and wherein the first event is any one of the plurality of candidate events.

14. The filtering model training method of claim 1, further comprising obtaining syllables corresponding to the corpus as the N original syllables based on third mapping relationship information, wherein the third mapping relationship information indicates the syllables of a plurality of corpora comprising the corpus.

15. A speech recognition method, comprising:

obtaining a sound signal of a corpus;

performing speech recognition on the sound signal from the corpus, wherein the speech recognition comprises filtering based on a filtering model and recognition processing;

obtaining a first recognition result after the speech recognition is performed on the sound signal of the corpus;

obtaining N original syllables comprised in an actual pronunciation of the corpus, wherein N is an integer greater than or equal to 1;

obtaining N recognized syllables from the first recognition result, wherein the N recognized syllables are in a one-to-one correspondence with the N original syllables;

obtaining N syllable distances based on the N original syllables and the N recognized syllables, wherein the N syllable distances are in a one-to-one correspondence with N syllable pairs, wherein the N syllable pairs comprise the N original syllables and the N recognized syllables, and wherein each of the N syllable distances indicates a similarity between an original syllable of the N original syllables and a recognized syllable of the N recognized syllables in a corresponding syllable pair of the N syllable pairs;

training the filtering model based on the N syllable distances; and performing filtering on the sound signal of the corpus based on the filtering model after the training; and performing recognition processing on the sound signal of the corpus after the filtering.

16. The speech recognition method of claim 15, further comprising obtaining the sound signal of the corpus using a first pickup device.

17. The speech recognition method of claim 15, further comprising obtaining the sound signal of the corpus based on environment information after the training.

18. A training device, comprising:

a processor; and a memory coupled to the processor and storing instructions that, when executed by the processor, cause the training device to be configured to:

perform speech recognition on sound signals from a corpus, wherein the speech recognition comprises filtering based on a filtering model and recognition processing;

obtain a first recognition result after the speech recognition is performed on the sound signals;

determine N original syllables comprised in an actual pronunciation of the corpus, and wherein N is an integer greater than or equal to 1;

determine N recognized syllables from the first recognition result, wherein the N recognized syllables are in a one-to-one correspondence with the N original syllables;

determine N syllable distances based on the N original syllables and the N recognized syllables, wherein the N syllable distances are in a one-to-one correspondence with N syllable pairs, wherein the N syllable pairs comprise the N original syllables and the N recognized syllables, and wherein each of the N syllable distances indicates a similarity between an original syllable of the N original syllables and a recognized syllable of the N recognized syllables in a corresponding syllable pair of the N syllable pairs; and train the filtering model based on the N syllable distances.

19. A speech recognition device, comprising:
a processor; and
a memory coupled to the processor and storing instructions that, when executed by the processor, cause the speech recognition device to be configured to:
  obtain a sound signal of a corpus;
  perform speech recognition on the sound signal, wherein the speech recognition comprises filtering based on a filtering model and recognition processing;
  obtain a first recognition result after the speech recognition is performed on the sound signals;
  determine N original syllables comprised in an actual pronunciation of the corpus, and wherein N is an integer greater than or equal to 1;
  determine N recognized syllables from the first recognition result, wherein the N recognized syllables are in a one-to-one correspondence with the N original syllables;
  determine N syllable distances based on the N original syllables and the N recognized syllables, wherein the N syllable distances are in a one-to-one correspondence with N syllable pairs, wherein the N syllable pairs comprise the N original syllables and the N recognized syllables, and wherein each of the N syllable distances indicates a similarity between an original syllable of the N original syllables and a recognized syllable of the N recognized syllables in a corresponding syllable pair of the N syllable pairs;
  train the filtering model based on the N syllable distances; and
  performing filtering on the sound signal of the corpus based on the filtering model after the training; and
  performing recognition processing on the sound signal of the corpus after the filtering.

20. The speech recognition device of claim 19, wherein the instructions further cause the processor to be configured to obtain the sound signal of the corpus based on environment information after the training.

* * * * *